US008725581B2

(12) United States Patent
Breed et al.

(10) Patent No.: US 8,725,581 B2
(45) Date of Patent: May 13, 2014

(54) APPARATUS AND METHODS FOR EFFICIENT DELIVERY OF AUCTION ITEM INFORMATION

(71) Applicant: MoblieTrac, LLC, San Diego, CA (US)

(72) Inventors: Paul Breed, San Diego, CA (US); James Michael Irish, San Diego, CA (US)

(73) Assignee: MoblieTrac, LLC, San Diego, CA (US)

( * ) Notice: Subject to any disclaimer, the term of this patent is extended or adjusted under 35 U.S.C. 154(b) by 0 days.

(21) Appl. No.: 13/799,513

(22) Filed: Mar. 13, 2013

(65) Prior Publication Data
US 2013/0259313 A1 Oct. 3, 2013

Related U.S. Application Data

(63) Continuation of application No. 12/500,513, filed on Jul. 9, 2009.

(60) Provisional application No. 61/134,655, filed on Jul. 10, 2008, provisional application No. 61/218,335, filed on Jun. 18, 2009.

(51) Int. Cl.
*G06Q 30/00* (2012.01)
(52) U.S. Cl.
USPC ........... 705/26; 705/26.3; 705/26.61; 705/80; 705/26.81; 382/104; 382/182; 701/35; 701/29.6
(58) Field of Classification Search
USPC .................... 705/26, 26.3, 1, 13; 701/35, 29.6
See application file for complete search history.

(56) References Cited

U.S. PATENT DOCUMENTS

| | | | |
|---|---|---|---|
| 4,989,144 A | 1/1991 | Barnett | |
| 5,063,507 A | 11/1991 | Lindsey et al. | |
| 5,285,383 A | 2/1994 | Lindsey et al. | |
| 5,325,291 A | 6/1994 | Garrett et al. | |
| 5,521,815 A | 5/1996 | Rose | |
| 6,076,064 A | 6/2000 | Rose, Jr. | |
| 6,259,354 B1 | 7/2001 | Underwood | |
| 7,113,853 B2 * | 9/2006 | Hecklinger | 701/29.6 |
| 7,228,298 B1 | 6/2007 | Raines | |
| 7,349,870 B1 * | 3/2008 | Mahoney et al. | 705/26.3 |
| 7,392,220 B1 | 6/2008 | Altarescu | |
| 7,421,322 B1 * | 9/2008 | Silversmith et al. | 701/29.6 |
| 7,505,838 B2 | 3/2009 | Raines et al. | |
| 2002/0143646 A1 | 10/2002 | Boyden et al. | |
| 2003/0036964 A1 * | 2/2003 | Boyden et al. | 705/26 |
| 2003/0130966 A1 | 7/2003 | Thompson et al. | |
| 2005/0086070 A1 | 4/2005 | Engelman | |

(Continued)

*Primary Examiner* — Vanel Frenel
(74) *Attorney, Agent, or Firm* — Gazdzinski & Associates, PC

(57) ABSTRACT

Apparatus and methods for efficient delivery of a plurality of information regarding items for auction. In one embodiment, the apparatus comprises a server entity adapted to communicate with a plurality of information sources (such as sources having vehicle history information, estimated valuation information, etc.) The server entity compiles information received from the plurality of sources and formats the information for efficient delivery to a client device via e.g., SMS based text messaging, internet-based instant messaging, or the like. In another salient aspect of the invention, a client enters an auction identification number (AID) rather than a longer alpha-numeric VIN or other identification number. The server entity may also calculate and communicate estimates and/or alerts/reminders of when bidding will begin for particular items for auction which the client has expressed interest in. Exemplary client interface and business methods are also given.

19 Claims, 14 Drawing Sheets

(56) References Cited

U.S. PATENT DOCUMENTS

| | | |
|---|---|---|
| 2005/0228736 A1 | 10/2005 | Norman et al. |
| 2010/0211440 A1* | 8/2010 | Leshem ............................ 705/13 |
| 2010/0299213 A1* | 11/2010 | Yeganeh .................... 705/14.71 |
| 2010/0312591 A1* | 12/2010 | Wu .................................. 705/7 |

\* cited by examiner

| WORLD MANUFACTURER IDENTITY | VEHICLE DESCRIPTION | VEHICLE IDENTIFICATION |
|---|---|---|
| 702 | 704 | 706 |

FIG. 7

APPARATUS AND METHODS FOR EFFICIENT DELIVERY OF AUCTION ITEM INFORMATION

PRIORITY

This application is a continuation of and claims priority to U.S. patent application Ser. No. 12/500,513, filed on Jul. 9, 2009 and entitled "APPARATUS AND METHODS FOR EFFICIENT DELIVERY OF AUCTION ITEM INFORMATION", which claims priority to U.S. Provisional Patent Application Ser. No. 61/134,655, filed on Jul. 10, 2008 and entitled "APPARATUS AND METHODS FOR EFFICIENT DELIVERY OF AUCTION ITEM INFORMATION" and U.S. Provisional Patent Application Ser. No. 61/218,335, filed on Jun. 18, 2009 and entitled "APPARATUS AND METHODS FOR EFFICIENT DELIVERY OF AUCTION ITEM INFORMATION", each of which are incorporated herein by reference in its entirety.

COPYRIGHT

A portion of the disclosure of this patent document contains material that is subject to copyright protection. The copyright owner has no objection to the facsimile reproduction by anyone of the patent document or the patent disclosure, as it appears in the Patent and Trademark Office patent files or records, but otherwise reserves all copyright rights whatsoever.

BACKGROUND OF THE INVENTION

1. Field of the Invention

The present invention relates in one exemplary aspect to improved methods and apparatus for the tracking and linking of vehicles or chattel to information regarding the history or other aspects of that item.

2. Description of Related Technology

Many vehicles, such as automobiles, boats, all terrain vehicles, motorcycles, sports vehicles, etc. come into the possession of auto dealers, financial institutions and/or other businesses and companies (hereinafter referred to collectively as "dealers") after having, in some cases, at least one previous owner/user. Dealers may come into possession of used vehicles as a result of the vehicle lease agreement ending, as partial payment for a new vehicle (i.e., a trade in), as rental cars or fleet/company vehicles which have been cleared out to make room for newer vehicles, and as repossessed vehicles.

Generally, these vehicles are accumulated and resold at vehicle auctions run by third parties. The general public is generally not permitted entrance into most vehicle auctions; rather only licensed dealers can participate.

During prior art vehicle auction processes, a dealer sends information about the vehicles the dealer will enter into the auction, including estimated sale values (as determined by the dealer), to an auction representative. In addition the auction provides its own estimated sale values based on previous auctions of similar vehicles. An auction representative then enters the information from the dealer as well as their own data into their inventory database prior to an auction. However, alternative methods including, for example, that described in U.S. Pat. No. 7,349,870 to Mahoney, et al., issued Mar. 25, 2008 and entitled "Method for the Resale of Vehicles" which describes a method and apparatus for the resale of vehicles including a server communicating over the Internet to a dealer computer and an auction computer. The server stores data corresponding to a schedule of auctions for resale of vehicles. The server provides access to itself by the dealer computer by way of a web site and allows the dealer to access the server to consign a vehicle to the auction. The server notifies the auction computer of the vehicle consigned to the auction at the web site. The server receives information about the vehicle from the dealer computer and determines an adjusted floor value for the vehicle and transmits the adjusted floor value to the auction computer.

When buying from among the vehicles at auction, the dealers are responsible for researching the particular vehicles of interest to determine the vehicle history and to determine a market and wholesale values of the vehicle.

Generally dealers are able to determine vehicle history by using the vehicle identification number (VIN number) and one or more accessible vehicle information servers. For example, U.S. Pat. No. 7,113,853, to Hecklinger issued Sep. 26, 2006 and entitled "System and Method for Generating Vehicle History Information" which describes a system, method and computer readable storage medium for generating vehicle history information are provided which, based on vehicle history records, determine whether a particular vehicle has a reliability issue and/or has passed import inspection. The reliability issue portion accesses a central database of vehicle history records for particular vehicles and a reliability issue data supplier look-up table to determine whether a reliability issue exists, and then displays the reliability issue or a file indicating that no reliability issue exists. The reliability issue may relate to a recall status of the vehicle and/or to the existence of a manufacturer buyback. The import compliance, or gray market, portion accesses the central database records to determine whether title/registration records in different countries exist along with an import record. Depending on the conclusions reached, the system and method displays an appropriate advisory record.

Determination of market and wholesale values of a vehicle may be accomplished in several ways, including via the dealer accessing one or more consolidated vehicle valuation information servers. For example, U.S. Patent Publication No. 20030036964, to Boyden, et al., published Feb. 20, 2003 and entitled "Method and System of Valuating Used Vehicles for Sale at an Electronic Auction Using a Computer" discloses a method and system using a computer for presenting vehicles for sale at an electronic auction. In one embodiment, the method comprises providing validated data regarding a specific vehicle that is to be presented for sale at the electronic auction. The accuracy of the data can be validated by comparing initial data regarding the vehicle provided by the seller with corresponding reference data to produce the validated data. The method can also include determining a first valuation for the vehicle by mapping the validated data to itemized valuation data.

Simultaneous to retrieving vehicle history and valuation information, dealers must also simultaneously place bids, track changing availability and position in the multiple lines ("lanes") of vehicles available for auction. Such auctions can move very fast, thereby providing the participating bidders little time to obtain information, evaluate it, and make a decision on whether to bid or not (and how much). These decisions can also be greatly impacted by the history of the vehicle; e.g., if there was more than one prior owner, if the vehicle was previously leased or privately owned, whether the vehicle has been in any accidents, what state the vehicle was owned in, etc.

Even the best extant technologies for accessing such information are not suitable for such fast-paced environment, wherein for example a dealer may have as little as one minute to make a decision on a given vehicle. Even 3G "smartphones" with comparatively high speed Internet access, whether over the cellular infrastructure or a WiFi or similar interface, typically can take as long as two minutes to access the necessary information (e.g., via client entry of a VIN), and are generally unreliable in the temporal aspect in terms of repeated accesses in a short period of time. Stated simply, existing Internet access techniques can take to long and can be too unreliable for use in the aforementioned fast-paced auction environment.

Accordingly, despite the foregoing systems and methods, there is still a salient need for more efficient, reliable, and timely techniques and apparatus for the delivery of vehicle information. Such improved techniques and apparatus would reliably provide at least the most germane information to a dealer in at a speed consistent with the fast-paced auction setting. Ideally the improved techniques and apparatus would also be compatible with existing and incipient personal electronics and networking technologies. Still further, exemplary apparatus and technique would be adapted to keep track of a dealer's particular vehicles of interest in order to inform and/or alert the dealer when vehicles of interest are available or coming up for auction, thereby relieving the dealer of constantly waiting and watching for their vehicle(s) of interest.

SUMMARY OF THE INVENTION

In a first aspect of the invention, apparatus for compiling information regarding a plurality of items in an auction is given. In one embodiment, the apparatus comprises at least one interface adapted to receive a request of the information from a client device; at least one digital processor; at least one storage apparatus in data communication with the processor; at least one interface for receiving information from one or more item information sources regarding at least one of the plurality of items in an auction. The digital processor (including one or more computer programs running thereon) is adapted to compile the information received from the one or more item information sources based on the at least one of the plurality of items, and format the information into a format suitable for transmission to the client device.

In a second aspect of the invention a method of efficiently providing information regarding at least one of a plurality of items in an auction is given. In one embodiment, the method comprises receiving a request for information regarding at least one of the plurality of items from a client device; requesting information from a plurality of item information sources regarding the at least one of the plurality of items; compiling the information; and formatting the information into a format suitable for transmission to the client device.

In a third aspect of the invention, one or more Item Information Collection (IIC) servers are utilized to service vehicle auctions. In one variant, the vehicles are thus associated with unique VIN numbers which are input from a client in order to return vehicle information. In another variant, the client uses a camera function of the client device to take a picture of the VIN number and input the picture to the IIC server.

In a fourth aspect of the invention, the one or more IIC servers are adapted to receive and compile any reports received from the various item information servers, including, inter alia, estimated resale servers, estimated wholesale servers, vehicle history servers and/or an auction servicer servers and to format the information into a formatted information report which is sent to the client device via an SMS server according to standard SMS message protocol.

In fifth aspect of the invention, the one or more IIC servers are adapted to, based on an auction identification (AID) number received from a client, request, receive and compile reports received from various item information servers and send the compiled information to the client in a format suitable for efficient transmission thereto. In one variant, the AID are cross-referenced to vehicle VIN.

In a sixth aspect of the invention, an item information collection (IIC) database is disclosed. In one embodiment, the IIC database generates a list of AID numbers and stores previously requested and formatted information reports by AID at a storage entity, and, as clients request information for one or more of the items based on AID numbers, the database creates a client list. In one variant, when a formatted report is generated a copy of it is sent to the client via return text message, and the other copy is pushed to the IIC database according to the AID which it relates, then when a client requests a formatted report, it is first determined whether one has been previously generated and it is forwarded to the client. In another variant, the IIC database client list links a particular client requesting the information to a formatted information report to be used for billing.

In a seventh aspect of the invention, delivery of formatted item information is fully automated in nature. In one embodiment, an application running on the client device is configured to utilize information regarding the most recent item sold at the auction to determine which item is next to be auctioned and communicate with the client device when a previously selected items are estimated to be soon passing the auction block (i.e., when bidding is soon to begin on the item) and/or to alert or remind the client of this fact.

In an eighth aspect of the invention, exemplary methods for delivering item information to a client are disclosed. In one embodiment, the item information is delivered from a server which requests and compiles information from a plurality of courses and condenses and formats the data for delivery to the client. In another embodiment, the item information is presented to a client automatically. In yet another embodiment, the item information is delivered from a stored copy present on a database.

In a ninth aspect, client interface for establishing an account with a server adapted to compile and efficiently deliver item information are described.

In a tenth aspect of the invention, a computer readable apparatus is disclosed. In one embodiment, the apparatus comprises a storage media adapted to store one or more computer programs which, when executed obtain and deliver information to a client device. In another embodiment, the computer program(s) obtain information from the client device (e.g., via a user interface) and cause transmission of a message to a remote entity such as a data or website server.

In an eleventh aspect, a client device capable of data communication with one or more communication networks is disclosed. In one embodiment, the client device comprises a data capture apparatus, at least one interface configured to communicate with one or more entities of the one or more communication networks, and a digital processor. The digital processor has at least one computer program configured to run thereon, and comprises a plurality of instructions which are configured to, when executed: (i) enable a user to generate a request for information, the request for information comprising at least one element for identifying at least one item for auction obtained via the data capture apparatus, (ii) transmit the request to the one or more entities of the communication network via the at least one interface, and (iii) in response to the request, receive a plurality of information regarding the at least one item for auction.

In one variant, the data capture apparatus comprises a camera. In another variant, the plurality of instructions further comprise an optical character recognition (OCR) algorithm configured to convert image data obtained via the data capture apparatus into an appropriate format for inclusion as the at least one element in the request for information. In yet another variant, the request for information and the received plurality of information regarding the at least one item for auction each comprise a short message service (SMS) text message. In still a further variant, the at least one element for identifying at least one item for auction comprises at least a portion of a vehicle identification number (VIN) of a vehicle for auction obtained via the data capture apparatus.

In another variant, a display element is configured to display a plurality of information regarding the at least one item for auction. In still another variant, the client device comprises a mobile handset, the at least one interface comprises a cellular interface, and the plurality of information regarding the at least one item is particularly configured to display on the display element. In a further variant, the plurality of information regarding the at least one item for auction comprises information relating to an estimated value of the at least one item for auction. In yet still a further variant, the plurality of information regarding the at least one item for auction comprises information regarding a vehicle history. In another variant, the plurality of information regarding the at least one item for auction comprises information relating to an estimated start time for beginning an auction of the at least one item. In yet another variant, the plurality of instructions further comprise an optical character recognition (OCR) algorithm configured to receive an unformatted version of the at least one element from the data capture apparatus and generate a formatted version of the at least one element for use in the request for information.

In a twelfth aspect, a method of providing information useful in making vehicle purchase decisions is disclosed. In one embodiment, the method comprises the method comprises receiving a message requesting information regarding at least one vehicle from a mobile device, the message comprising at least a portion of a vehicle identification number (VIN) for the at least one vehicle, the VIN comprising an image converted to text. In another embodiment. In another embodiment, the method comprises requesting information regarding the vehicle from an entity for compiling vehicle information, the request comprising at least a portion of the VIN. In yet another embodiment, the method comprises receiving at least one vehicle history report from the entity, the vehicle history report comprising at least information enabling a user to make a purchase decision. In yet another embodiment, the method comprises formatting the at least one vehicle history report into a format suitable for transmission to the mobile device.

In one variant, the image converted to text comprises an image obtained via at least one of (i) a camera integrated into the mobile device, and/or (ii) a scanner device in communication with the mobile device. In another variant, the mobile device comprises a mobile telephone, and the message is sent via a wireless cellular network associated with the mobile telephone. In yet another variant, the message requesting information comprises a short message service (SMS) text message received from the mobile device. In a further variant, the at least portion of a VIN comprises a shortened version of a complete VIN. In still a further variant, the method further comprises identifying a single vehicle corresponding to a shortened version of a complete VIN. In yet still a further variant, the format suitable for transmission to the mobile device comprises a short message service (SMS) text message, and the method further comprises transmitting the formatted SMS text message to the mobile device.

In a thirteenth aspect, an apparatus configured to provide information relating to one or more vehicles in an auction is disclosed. In one embodiment, the apparatus comprises: (i) at least one interface configured to enable communication between the apparatus, (ii) one or more client devices and at least one interface configured to enable communication between the apparatus and one or more vehicle information sources, and (iii) at least one digital processor comprising at least one computer program configured to run thereon, the at least one computer program comprising a plurality of instructions configured to, when executed: (iv) receive a message from the at least one client device requesting information regarding the one or more vehicles, the message identifying the one or more vehicles by providing at least a portion of a vehicle identification information associated therewith, the at least a portion of the vehicle identification information comprising information scanned or captured using an application running on the at least one client device, (v) request information regarding the one or more vehicles from the one or more vehicle information sources using at least a portion of the vehicle identification information, (vi) receive the information regarding the one or more vehicles, the information regarding the one or more vehicles comprising information useful in making purchasing decisions during the auction, and (vii) transmit the information regarding the one or more vehicles to the at least one client device.

In one variant, the apparatus further comprises an interface configured to enable access to at least a plurality of records identifying a respective plurality of subscribers, the plurality of records being used to collect billing information. In another variant, the message from the at least one client device requesting information regarding the one or more vehicles comprises a short message service (SMS) text message. In yet another variant, the information regarding the one or more vehicles comprises one or more of: accident history of the vehicle; and/or estimated value of the vehicle. In a further variant, the plurality of instructions further configured to verify at least one of the one or more client devices via login information received therefrom, the login information identifying a user of the at least one client device as one of the plurality of subscribers. In yet still a further variant, the login information identifying the user of the at least one client device as the one of the plurality of subscribers comprises a password or login identification associated with an account associated to the one of the plurality of subscribers. In another variant, the computer program being further configured to, if the login information cannot be verified, provide at least a portion of the login information or temporary login information at least one second client device, the at least one second client device being associated with the subscriber.

In a fourteenth aspect, a method for receiving vehicle information at a mobile device regarding a vehicle for sale is disclosed. In one embodiment, the method comprises receiving a data element at the device using a camera function on the mobile device, the data element comprising at least vehicle identification number (VIN) data related to the vehicle for sale. In another embodiment, the method comprises converting the VIN data into a format suitable for transmission over short message service (SMS). In yet another embodiment, the method comprises sending a request message from the mobile device to a server via the SMS, the request message comprising the converted VIN data. In yet still another embodiment, the method comprises, causing the server to communicate with at least one additional server, compile the vehicle information, and format the vehicle information. In another embodiment, the method comprises, receiving from the server the formatted vehicle information.

In one variant, the VIN data comprises at least one of: (i) a string of 17 alpha-numeric characters representative of the VIN, (ii) a shortened string of numbers representative of the VIN, or (iii) a barcode representative of the VIN. In another variant, the act of converting is performed by an optical character recognition (OCR) program. In yet another variant, the data element comprises an image. In a further variant, the formatted vehicle information comprises one or more of: accident history of the vehicle for sale; and/or estimated value of the vehicle for sale.

These and other aspects shall become apparent when considered in light of the disclosure provided herein.

BRIEF DESCRIPTION OF THE DRAWINGS

FIG. 7 is a block diagram illustrating an exemplary vehicle identification number (VIN) according to the present invention.

DESCRIPTION OF THE INVENTION

Figure 1:
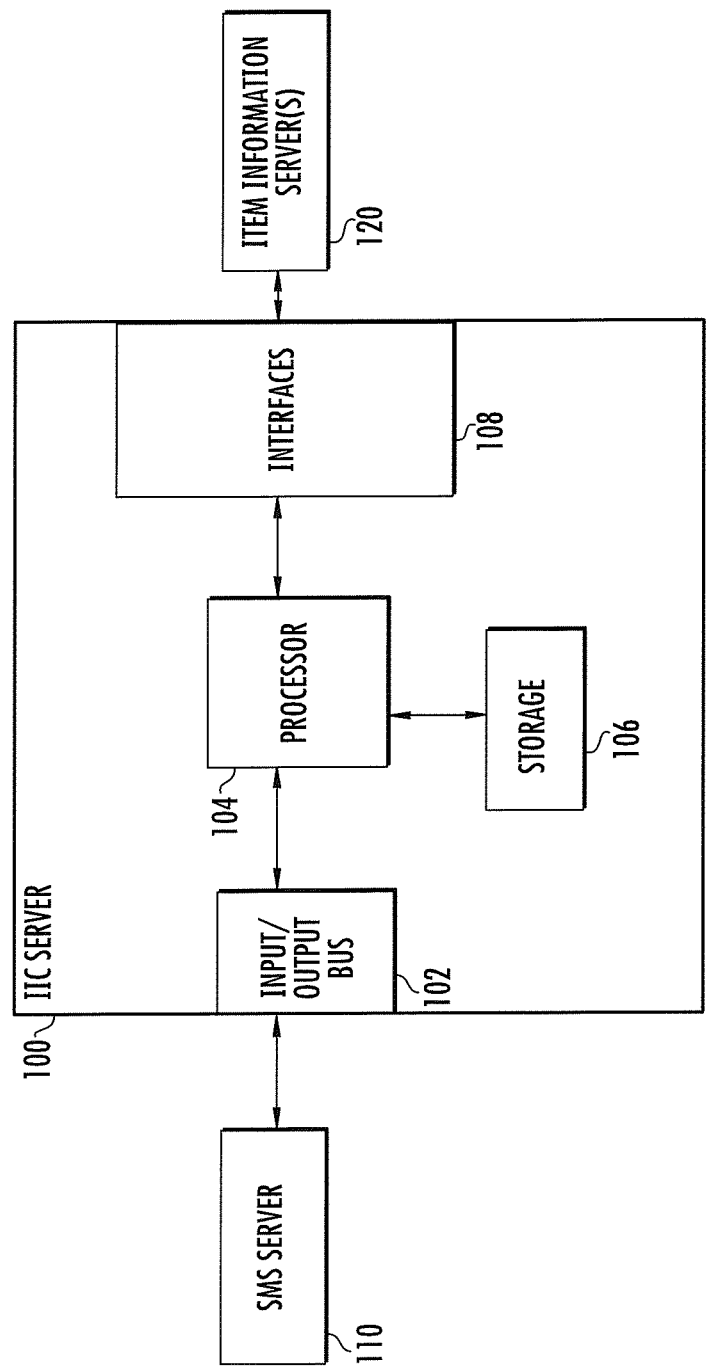
FIG. 1 is a block diagram illustrating an exemplary item information collection (IIC) server of the present invention.

Reference is now made to the drawings listed above, wherein like numerals refer to like parts throughout.

As used herein, the term "application" refers generally to a unit of executable software that implements theme-based functionality The themes of applications vary broadly across any number of disciplines and functions (such as e-commerce transactions, shipping transactions, entertainment, calculator, Internet access, etc.), and one application may have more than one theme. The unit of executable software generally runs in a predetermined environment; for example and without limitation, the unit could comprise a downloadable Java Xlet™ that runs within the JavaTV™ environment.

As used herein, the terms "client device," "terminal," "personal electronic device" (PED) and "user device" include, but are not limited to, personal computers (PCs), whether desktop, laptop, or otherwise, personal digital assistants (PDAs) such as the "Palm®" family of devices, cellular or "smart" phones such as the Apple iPhone, handheld computers, J2ME equipped devices, personal media devices, set-top boxes, or literally any other device capable of interchanging data with a network. Such devices may interface using wired or optical fiber mechanisms such as an IEEE Std. 802.3 Ethernet interface, Digital Subscriber Line (DSL), DOCSIS modem, hybrid fiber-coax (HFC) cable, FireWire (IEEE Std. 1394), or alternatively via wireless mechanisms and protocols such as 3GPP/3GPP2, Bluetooth™, IrDA interface, IEEE Std. 802.11, UWB (e.g., IEEE-Std. 802.15 or similar), WiMAX (802.16), Wireless Application Protocol (WAP), GPRS, GSM, or any other of myriad data communication systems and protocols well known to those of skill in the communications arts.

As used herein, the term "computer program" is meant to include any sequence of human or machine cognizable steps which perform a function. Such program may be rendered in virtually any programming language or environment including, for example, C/C++, Fortran, COBOL, PASCAL, assembly language, markup languages (e.g., HTML, SGML, XML, VoXML), and the like, as well as object-oriented environments such as the Common Object Request Broker Architecture (CORBA), Java™ (including J2ME, Java Beans, etc.) and the like.

As used herein, the term "database" refers generally to one or more tangible or virtual data storage locations, which may or may not be physically co-located with each other or other system components.

As used herein, the term "digital processor" is meant generally to include all types of digital processing devices including, without limitation, digital signal processors (DSPs), reduced instruction set computers (RISC), general-purpose (CISC) processors, microprocessors, gate arrays (e.g., FPGAs), PLDs, reconfigurable compute fabrics (RCFs), array processors, and application-specific integrated circuits (ASICs). Such digital processors may be contained on a single unitary IC die, or distributed across multiple components.

As used herein, the term "display" means any type of device adapted to display information, including without limitation CRTs, LCDs, TFTs, plasma displays, LEDs, and fluorescent devices.

As used herein, the term "integrated circuit (IC)" refers to any type of device having any level of integration (including without limitation ULSI, VLSI, and LSI) and irrespective of process or base materials (including, without limitation Si, SiGe, CMOS and GAs). ICs may include, for example, memory devices (e.g., DRAM, SRAM, DDRAM, EEPROM/Flash, ROM), digital processors, SoC devices, FPGAs, ASICs, ADCs, DACs, transceivers, memory controllers, and other devices, as well as any combinations thereof.

As used herein, the term "memory" includes any type of integrated circuit or other storage device adapted for storing digital data including, without limitation, ROM, PROM, EEPROM, DRAM, SDRAM, DDR/2 SDRAM, EDO/FPMS, RLDRAM, SRAM, "flash" memory (e.g., NAND/NOR), and PSRAM.

As used herein, the term "network" refers generally to data or communications networks regardless of type, including without limitation, LANs, WANs, intranets, internets, the Internet, cable systems, telecommunications networks, satellite networks, and Virtual Private Networks (VPNs), or collections or combinations thereof, whether based on wired, wireless, or matter wave modalities. Such networks may utilize literally any physical architectures and topologies (e.g. ATM, IEEE-802.3, X.25, Token Ring, SONET, 3G/3GPP/UMTS, 802.11, 802.16, 802.15, Hybrid fiber-coax (HFC), etc.) and protocols (e.g., TCP/IP, HTTP, FTP, WAP, GPRS, RTP/RTCP, etc.).

As used herein, the term "service provider" refers generally to services provided remotely to the user including, for example, data streaming, data analysis, financial account management and trading, data archiving and storage, Internet access, content delivery, telecommunications, etc.

As used herein, the term "speech recognition" refers to any methodology or technique by to which human or other speech can be interpreted and converted to an electronic or data format or signals related thereto. It will be recognized that any number of different forms of spectral analysis (such as MFCC (Mel Frequency Cepstral Coefficients) or cochlea modeling, may be used. Phoneme/word recognition, if used, may be based on HMM (hidden Markov modeling), although other processes such as, without limitation, DTW (Dynamic Time Warping) or NNs (Neural Networks) may be used. Myriad speech recognition systems and algorithms are available, all considered within the scope of the invention disclosed herein.

As used herein, the term "vehicle" refers to any form of air, land or water transportation for either person, animals, and/or inanimate objects including, without limitation, buses, cars, sports utility vehicles, all terrain vehicles, motorcycles, boats etc.

DESCRIPTION OF EXEMPLARY EMBODIMENTS

It is noted that while the system and methods of the invention disclosed herein are described with respect to delivery of information regarding vehicles in an auction, certain aspects of the invention may be useful in other applications, including, without limitation, other types of auctions, such as those for chattel (including e.g., fine arts or other such auctions).
Item Information Collection (IIC) System One salient feature of the present invention is the utilization of one or more Item Information Collection (IIC) servers. An exemplary IIC server 100 is illustrated in FIG. 1. As shown, the IIC server 100 generally comprises an input/output bus 102, a storage device 106, a digital processor 104 and a plurality of interfaces 108 for connection to other devices (not shown) via one or more networks.

The input/output bus 102 of the IIC server 100 is the subsystem for the transfer of data into and out of the IIC server 100. For example, data in the form of a request may be transferred into the server 100 from client devices via a short message service (SMS) server 110; and item information may be transferred out of the server 100 to the SMS server 110 and on to associated client devices.

The storage device 106 of the IIC server 100 is adapted to store processed and formatted item information. In one embodiment, the items may comprise vehicles and the processed and formatted item information may be stored by vehicle VIN number (see e.g., the VIN embodiment discussed below with respect to FIG. 2). In another embodiment, items are referenced by auction identification number (AID), which will be discussed in greater detail below (see e.g., the AID embodiment discussed below with respect to FIG. 3), the AID may be cross-referenced to VINs in vehicle auctions.

As illustrated, the IIC server 100 further comprises a digital processor 104, which, in one embodiment, houses computer programs configured to cause the server to generate requests to various item information servers 120 as well as format data received from the item information servers 120 into data which is more efficiently transmitted and more easily read by the client devices associated with the SMS server 110. Other functions of the digital processor 104 will be discussed in detail below as well. Exemplary item information servers 120 include, inter alia, estimated resale servers, estimated wholesale servers, AID database, auction servicer servers and/or vehicle history servers for situations involving the auction of vehicles. Formatting may, in one embodiment, comprise summarizing and/or presenting only portions of the data received so as to generate a message which is most germane or suitable (i.e., simple or small enough) for transmission to a client via text or other messaging in a timely and reliable manner.

It is also appreciated that the methods of the present invention may be practiced using any configuration or combination of hardware, firmware, or software, and may be disposed within one or any number of different physical or logical entities. Myriad different configurations for practicing the invention will be recognized by those of ordinary skill in the network arts provided the present disclosure.

The IIC server 100 can also be masked or controlled by a "business rules engine" or other logical wrapper or layer as described subsequently herein.
Item Information Collection Using Vehicle Identification Number (VIN)

Figure 2:
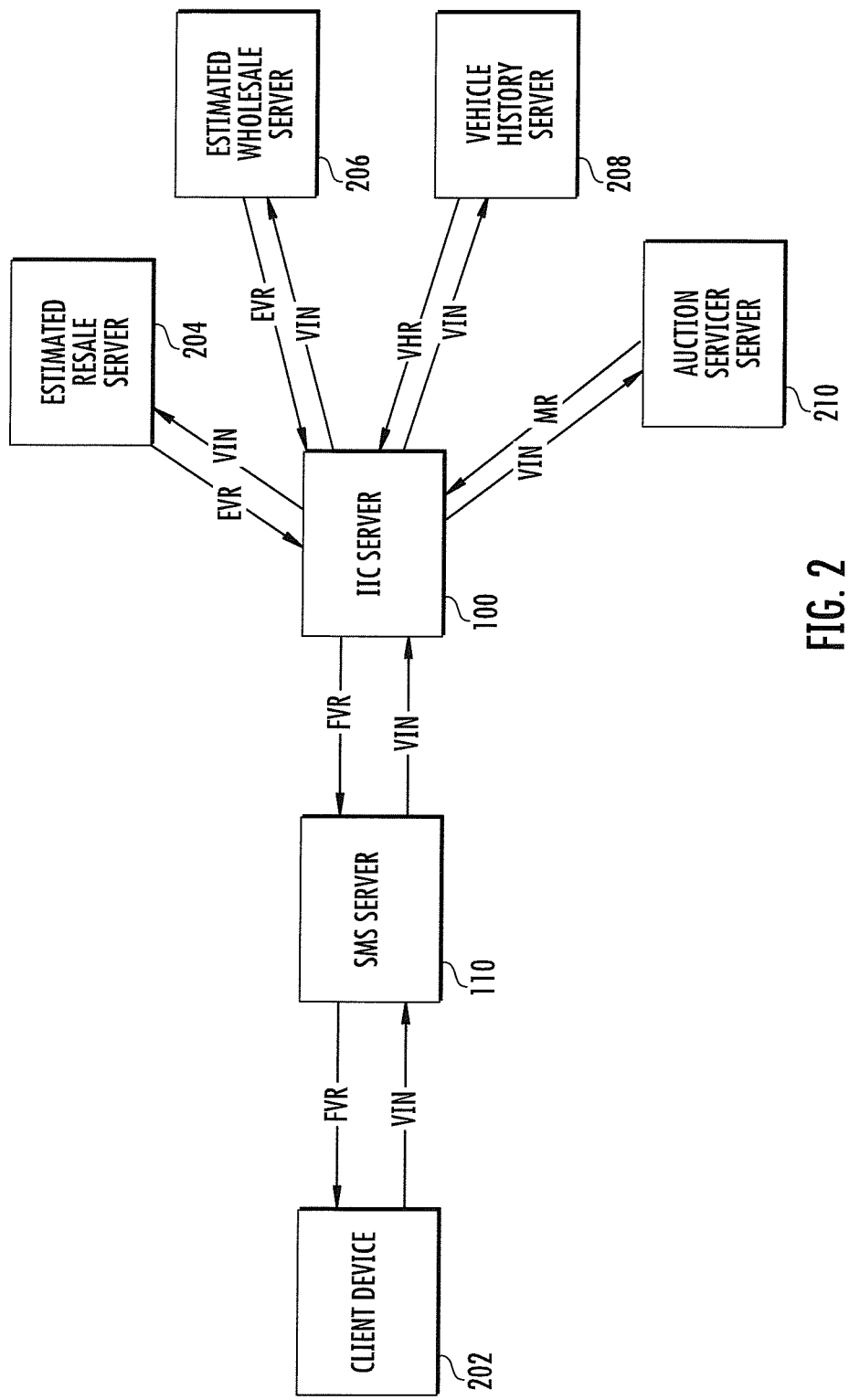
FIG. 2 is a block diagram illustrating an exemplary system utilizing the IIC server of FIG. 1 for efficiently delivering item information based on a vehicle identification number (VIN).

In one embodiment of the present invention, the IIC server 100 services vehicle auctions. In another embodiment, customers may obtain information regarding vehicles in private sales. The vehicles are thus associated with unique VIN numbers which are input from a client in order to return vehicle information, as illustrated in FIG. 2. Although illustrated and described in terms of SMS-based text messaging, it will be appreciated that communication to and from the client device may occur via any number of mechanisms including, inter alia, web-based instant messaging.

As shown, in FIG. 2, at a client device 202, the client enters the vehicle VIN number as a text message. The VIN is then sent to an SMS server 110 which forwards the message to the IIC server 100. At the IIC server, the VIN number is used in a request message which is sent to any number of item information servers 120. In the exemplary embodiment of FIG. 2, the IIC server 100 may request information from an estimated resale server 204, an estimated wholesale server 206, a vehicle history server 208 and/or an auction servicer server 210; however alternate servers adapted to transmit information regarding used items may also be used consistent with the present invention.

The estimated resale 204 and wholesale 206 servers, upon IIC server 100 request will provide estimated value reports (EVR) to the IIC server 100. The EVR of the estimated resale server 204 includes an estimate of the amount a client may expect to be able to resale the vehicle for. The EVR of the estimated wholesale server 206 includes an estimate of the amount a client may expect to pay wholesale for the vehicle.

The vehicle history server 208 uses the vehicle VIN to retrieve a vehicle history report (VHR). In one embodiment, the vehicle history server 208 may be configured to return history reports generated by, inter alia, a department of motor vehicles, Autocheck™, CarFax™, or generated by any number of web-based servers such as, inter alia, isitalemon.com, eztitlesearch.com, ebay.com, cardectective.com, Gov-Reports.com, etc.

The auction servicer server 210 is a server associated with an online auction site which provides other market information to the IIC server 100 in the form of a market report (MR) including inter alia a crossreferenceable auction identification number (AID) to vehicle identification number (VIN) table. In one embodiment, the auction service server 210 may comprise an auction servicer such as the well-known Manheim, Adesa and many others. Manheim provides the vehicle dealers with a marketplace in which they can acquire vehicles, research vehicles in advance and inspect them in person before bidding. In addition auction companies provide certification of current state of the vehicle.

The IIC server 100 is adapted to receive and compile any reports received from the various item information servers 120 (including, inter alia, EVR, VHR, and/or MR). Computer applications located on the processor 104 of the server 100 direct the formatting of the reported information into a form that is suitable for transmission via SMS message (e.g., text message), termed a formatted item report (FIR). In one embodiment, the FIR is duplicated and one copy is sent for storage at an IIC database (not shown), which will be discussed in greater detail below.

The FIR is then sent to the client device 202 via the SMS server 110 according to standard SMS message protocol. This approach (use of extant SMS servers and protocol) advantageously obviates the need for additional adaptation or modification of the existing cellular or wireless infrastructure, although it will be appreciated that other bearer transports and protocols may be used consistent with the invention.

In another embodiment, the client may, rather than inputting the vehicle VIN number, instead use a camera function of the client device 202 to take a picture of the VIN number, or OCR software and a scanner. The client device 202 will then utilize the optical character recognition program (such as GOCR, JOCR, etc.) to convert the pictured image to text, the text is then sent to the SMS server 110 and on to the IIC server 100 as discussed above. The VIN may also be represented by one or more bar codes, which might be distributed to users before the auction.

It is appreciated that other forms of VIN entry may also be utilized including e.g., speaking or saying the number into a client device capable of recognizing and translating the speech to text. For instance, a speech recognition algorithm may be resident within the program memory of the device, and in conjunction with a microphone, convert received analog signals from a user (e.g., a VIN or AID) into a digital representation thereof, which is then used to populate an appropriate FIR. Such speech recognition algorithms and systems are well known in the art, and accordingly not described further herein. In yet another embodiment, the speech recognition system may be implemented at the IIC server 100 or other entity of the herein described invention.

Item Information Collection Using Auction Identification Number (AID)

Figure 3:
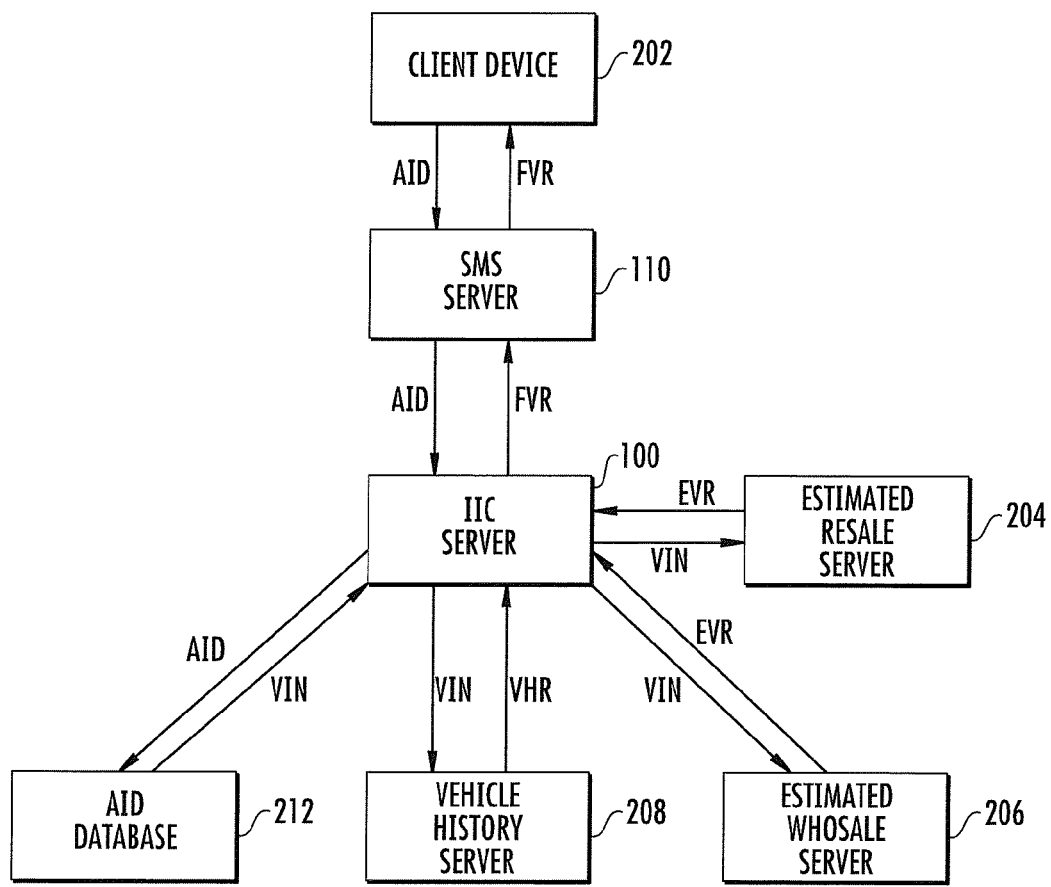
FIG. 3 is a block diagram illustrating an exemplary system utilizing the IIC server of FIG. 1 for efficiently delivering item information based on an auction identification (AID) number.

In yet another embodiment, the IIC server 100 of the present invention utilizes an AID number which is input from a client in order to return item information, as illustrated in FIG. 3. Although FIG. 3 demonstrates sending and receiving data to a client device via SMS-based text messaging, it will be appreciated that such communication may occur via any number of mechanisms including, inter alia, web-based instant messaging.

Modern VIN numbers are 17 character alpha-numeric serial numbers used to particularly identify an item. These are often printed on the vehicle, however, in a fast-paced auction situation, they may be hard to read and quickly enter into a client device in order to gain access to information relating thereto. Accordingly, the present embodiment of the invention utilizes an AID, which are auction-specific identification numbers comprised of a lane number (two digit number), followed by a hyphen, and a space number (three digit number). The AID is indicative of when and where the vehicle will be run. In a vehicle auction situation, the AID is significantly smaller and is made much more visible to the bidders than a VIN number and may be entered at a client device much more quickly, thus providing access to information regarding a vehicle more quickly. Likewise, a client entering an AID (five digits) is less likely to make an error than a client entering a VIN number (17 digits). In auctions involving other items (e.g., not vehicles or items having VIN numbers), utilization of an AID helps assist clients in specifically identifying an item.

If used in a vehicle auction, the AID are determined and cross-referenced to vehicle VIN by an auction-operated AID database 212 prior to an auction. In other words, the auction representatives, prior to an auction will enter AID and their corresponding VIN into an AID database. As illustrated in FIG. 3, a client then need only input the AID at a client device 202 in order to quickly and easily receive information regarding particular vehicles.

Specifically, as FIG. 3 illustrates, clients enter one or more AID at client devices 202, which then forward the AID containing message to the IIC server 100 via the SMS server 110. The IIC server 100 then sends a request containing the AID to the AID database 212 for translation into a VIN number. The VIN number is then sent in a request to various item information servers 120, including, inter alia, an estimated resale server 204, an estimated wholesale server 206, and/or an estimated vehicle history server 208. These entities may also be integrated into one unified server, or any combinations thereof. The item information servers 120 return to the IIC server 100 EVR, VHR and/or other item reports.

As in the embodiment of FIG. 2, the IIC server 100 retrieves information from the received reports and formats a FIR. In one embodiment, two FIR are generated; one is pushed for storage at a IIC database (not shown) and the other is sent to the client device 202 via the SMS server 110.

Error Checking Functions

The various embodiments of the invention described herein may also be configured with an ambiguity resolution system or algorithm. For example, suppose a user enters an AID or VIN which is one digit off from the actual number. This could cause the system to return an erroneous report (or none at all), thereby wasting precious time for the user. Accordingly, several mechanisms can be used to mitigate this circumstance. In one variant, a local client checker algorithm is used to match a client-entered number (whether via graphical UI, speech, scanner, or otherwise) with a prestored list of VINs or AIDs for that day (obtained from the auction manager). Simply stated, if the entered number does not match anything up for auction that day, an error message will be immediately generated, and optionally the defective (non-matching) portion of the number highlighted on the display.

In another variant, a "back end" checking system can be used, wherein the same function as that previously described for the client is performed on one or more back-end servers.

In more sophisticated embodiments, the error checking functions comprise the user entering one or more additional pieces of information about the vehicle so that the entered VIN or AID can be cross-referenced. For instance, along with the VIN/AID, the user might also enter or say "Aston Martin" (referring to the mfgr.) and "black" (referring to the vehicle's color). The back-end server can then also match these elements (which may be coded by numbers, letters, etc. which are derived from the user's "plain language" input) to those stored with the VIN for the vehicle, in effect cross-checking the VIN and additional data to be sure that all match up. If, for example, the VIN entered by the user is one digit off, it may return a different color vehicle, which would indicate an error in the VIN somewhere. If the AID were one digit off, it may return a vehicle of a totally different make and perhaps color. In this way, the user will not be inadvertently "spoofed" by receiving a message from the server with information that ostensibly appears to be relevant, but in fact actually relates to a totally different vehicle. It may take the user an appreciable amount of time to recognize this error, delete the data, and re-enter and receive the correct data, which may also be too late to place a bid.

Item Information Collection (IIC) Database

Figure 4:
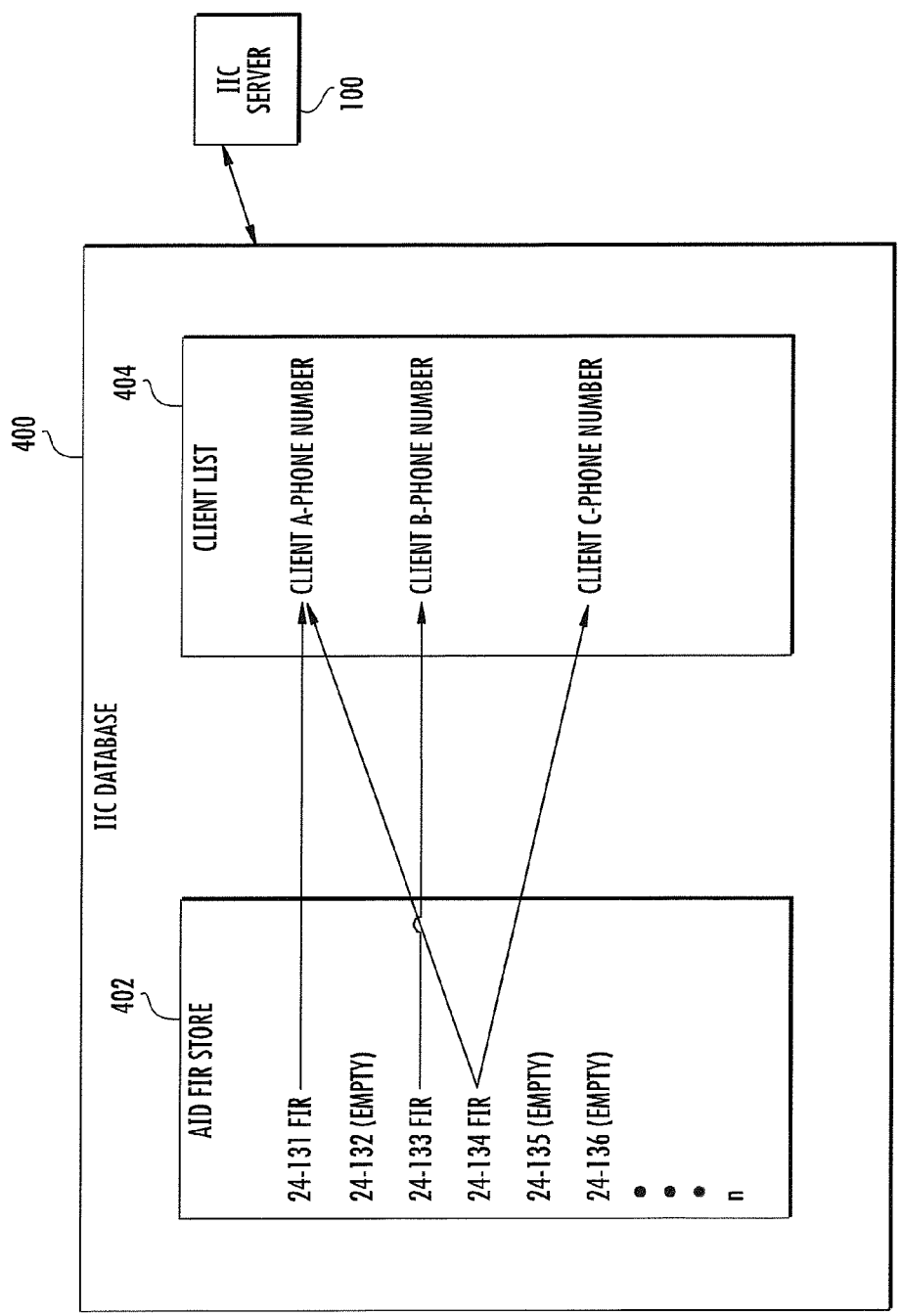
FIG. 4 is a block diagram illustrating an exemplary IIC database for use with the IIC server of FIG. 1.

An exemplary IIC database 400 is illustrated in FIG. 4. In the illustrated embodiment, the IIC database 400 generates a list of AID numbers and stores FIR under the AID as these are generated in an AID FIR store 402. As clients request information for one or more of the items based on AID numbers, the database creates a client list 404. The client list 404 lists clients by name (e.g., "Client A", "Client B", "Client C"), telephone number and/or account number and cross references the clients to the AID numbers of the items they have expressed interest in and/or received information about.

It is also appreciated that, in another embodiment (not shown), the IIC database 400 may collect and cross reference according to VIN numbers rather than AID numbers. The IIC database 400 is thus in data communication with the IIC server 100 and in one embodiment, one or more of the functions discussed herein are the result of one or more applications running on the processor 104 of the IIC server 100

As illustrated in FIG. 4, the AID FIR store 402 first creates a list of all AID for each of the items at a particular auction the AID entries will be empty when the store 402 is created. Then, a client requests information about the item by sending to the IIC server 100 the item AID in a text message (see also VIN embodiments above). As discussed above, the IIC server 100 will take appropriate action to retrieve information and format the information into an FIR. One copy of the FIR is sent to the client via return text message, and the other copy is pushed to the IIC database 400 for storage in the AID FIR store 402 according to the AID which it relates. The IIC database 400 also creates an entry in the client list 404 for the particular client requesting the information and links the AID FIR entry to the client entry to be used for billing and/or other purposes.

For example, suppose Client A requests information about items 24-131 and 24-134. When generated, the FIR will be placed in the AID FIR store 402 for each of the AID and linked to a client entry for Client A. Then, when Client B requests information about item 24-133, the database 400 will search the AID FIR store 402 to determine whether an FIR has previously been generated. The database 400 "knows" if one has been generated by determining whether the entry is empty or not. In the case of item 24-133, Client A had not previously requested information regarding that item. Thus, the entry is empty and the IIC server 100 will be triggered to begin generating an FIR (as discussed above), once completed one copy will be stored in the AID FIR store 402 and Client B will be entered into the client list and linked to the AID FIR store 402 entry, Client C then requests information about item 24-134 (which was previously requested by Client A). The database 400 determines that the entry contains the FIR and thus copies it and forwards the copy to Client C, while also linking Client C to the AID FIR 402 entry.

Automatic FIR Delivery

In yet another embodiment, the present invention is fully automated in nature. According to this embodiment, the client is not required to enter any information regarding items of interest upfront. Rather, an application running on the client device is configured to utilize information regarding the most recent item sold at the auction to determine which item is next to be auctioned. The interactive application then prompts the client for whether the client is interested in receiving the FIR for the item. If the client discloses an interest, then, as described above, the IIC server 100 will request information from various item information servers 120 and generate an FIR therefrom. As noted above, in one embodiment, the server 100 may also create a duplicate FIR for storage at an AID database 400 (or other similar database utilizing VIN rather than AID).

For example, suppose that a client activates the interactive application running on the client device while the lineup of items at an auction is as given below:

Item 225: BMW 330
Item 226: BMW 650
Item 227: BMW 545

The application will retrieve information from the IIC server 100 which is in data communication, via a live feed, to an auction-operated server or some other server or database that is updated as items are bought and sold at the auction. The retrieved information will enable the application to determine which item in the lineup was the last to be bought/sold, and/or which is currently being bid upon. Because vehicle auctions in particular proceed very rapidly, the application in that context will automatically default to the next available item. Thus, if the application were activated while Item 225 was on the auction block, the application would automatically default to Item 226, which is the first item the client may reasonably seek information about and/or expect to place a bid on. This avoids the system "lagging" real time. The application thus prompts the client concerning the client's interest in information regarding that item (specifically information in the form of a FIR compiled from, inter alia, EVR, VHR and MR). If the client responds affirmatively (indicating a desire to view the information regarding Item 226), the application requests the information and receives a text message FIR which is displayed to the client. Accordingly, the client is able to get information on the items as they come across the auction block, without having to enter a VIN (or taking a picture or scan thereof) or an AID.

Reminders/Alerts and Time Estimates

Figure 5:
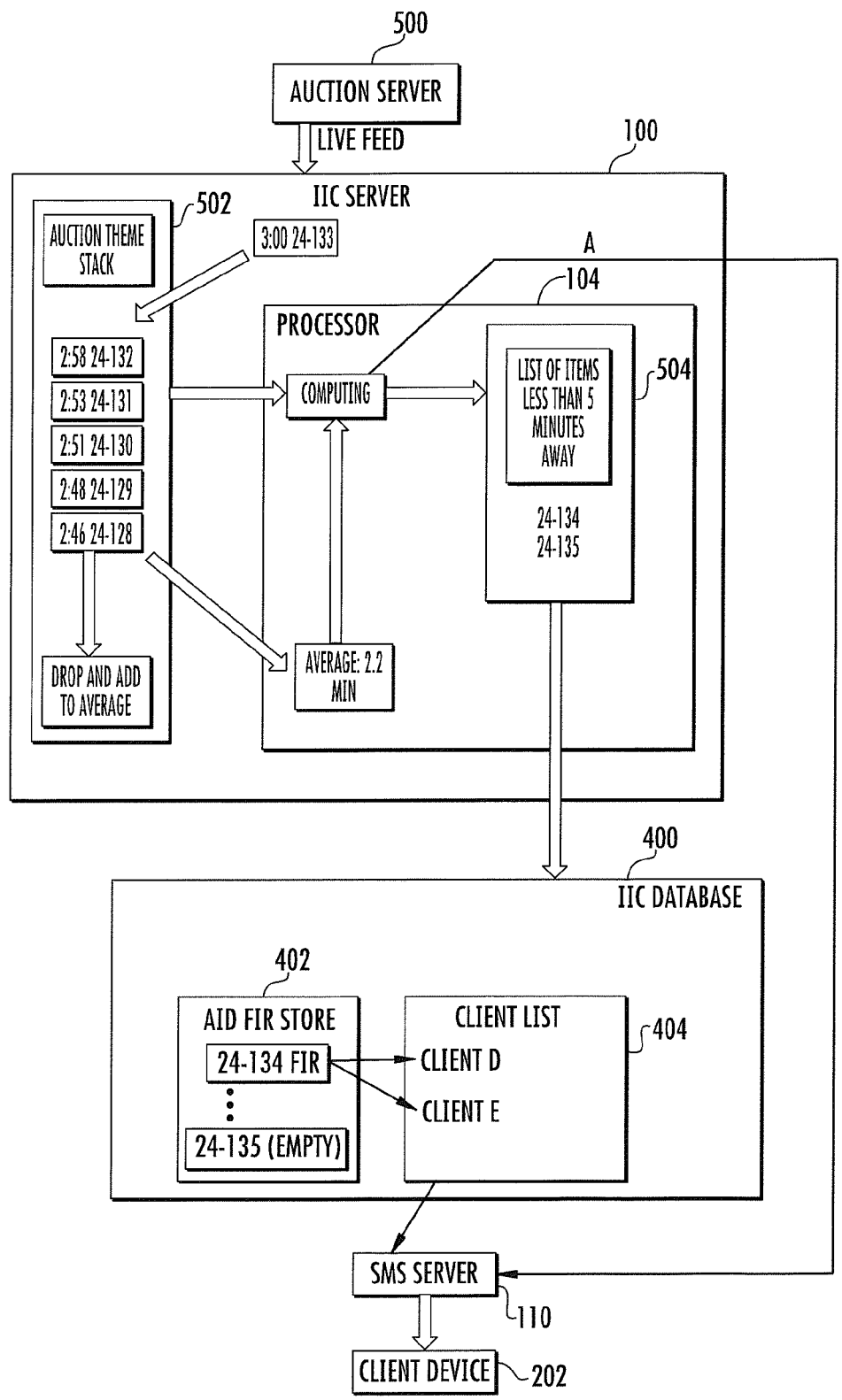
FIG. 5 is a block diagram illustrating an exemplary system utilizing the IIC server and IIC database of FIGS. 1 and 4, respectively to notify a client of an estimated time when an item will begin auction.

Referring now to FIG. 5, an embodiment is described wherein the IIC server 100 is configured to communicate with the client device when previously selected items are estimated to be soon passing the auction block (i.e., when bidding is soon to begin on the item), and/or to alert or remind the client of this fact. Although illustrated and described in terms of SMS-based text messaging, it will be appreciated that communication may occur via any number of mechanisms including, inter alia, web-based instant messaging or WAP (wireless application protocol) or the like.

The IIC server 100 may communicate estimates, reminders and/or alerts in various situations. For example a reminder/alert may be sent upon client selection to be reminded/alerted, e.g., at the time of viewing a received FIR at the client device, the client selects to be reminded/alerted when this item is soon to come on the auction block (e.g., five minutes in advance). Also, estimates may be sent upon client request for a time estimate for a specific item, e.g., by sending an SMS message to the IIC server 100 stating the command "time" or "time estimate" or the like, and the AID or VIN used to identify the item. It is also appreciated that the client may select a time prior to the beginning of bidding to receive reminders/alerts and/or that the client may choose to receive a reminder/alert even after having been given a time estimate.

As illustrated in FIG. 5, the IIC server 100 is adapted to receive a live feed from an auction-operated server 500 (or other server providing updated information regarding the sale of items at the auction). The auction server 500 gives constant updates as to the time each item for auction is sold. This information is added to an auction time stack 502 in the server 100. The auction time stack 502 is averaged after each new sale time addition and the averaged information is used to compute a dynamic list 504 of items which are estimated to be less than a set number of minutes away. In the exemplary embodiment the processor 104 uses 5 minutes, however longer or shorter periods may be utilized consistent with the present invention, and may in fact be varied as a function of the then-prevailing situation or dynamics of the auction (e.g., two minutes for anything in Lane 2, five minutes for anything in Lane 4, etc.).

The information held in the dynamic list 504 is then compared (by AID or VIN number) it the AID FIR list 402 of the IIC database 400, in order to determine if any clients have shown interest in the items whose auctions will begin shortly. The dynamic list 504 may also be compared to other database 400 lists (not shown) including lists for those clients who have specifically requested a reminder/alert regarding particular items.

As illustrated in FIG. 5, Client D is linked to items 24-134, and Client E is also linked to item 24-134. Thus, since item 24-134 is in the list of items less than 5 minutes away, the IIC server 100 sends an alert or reminder text (or other) message via the SMS server 110 to the client devices 202 of Clients D and E indicating that bidding is soon to begin for that item.

In a situation where a client has requested a time estimate, via pathway A, the processor 104 computes, based in part on the averages determined from the auction time stack 502, when bidding on that particular item should begin and reports that to the client device 202 via the SMS server 110.

The mechanism described in FIG. 5 may also be used, to enable a client to request the current item (by AID) being bid on in all lanes using a command which states, "AID", "current AIDs" or the like.

Inspection Information

In another embodiment, the IIC server 100 may also access an inspection information server (not shown) giving item condition information such as, inter alia, whether there are/is scratches, dents, frame damage, etc. to a vehicle. Providing such information obviates the client having to access the vehicle's appearance from a mere glance and without significant inspection. Rather, the auction operators and/or a third party will view the auction vehicles appearances and actual physical characteristics in detail and report relevant information to a database listed by VIN or AID which is accessed by the IIC server 100 in much the same manner as the other item information servers 120 discussed above. Note that this inspection information may be different than or not contained in a CarFax or similar third-party report, the latter which may describe only if the car has had any major accidents (e.g., those reported to police or DMV), hail damage, flooding, etc., but not necessarily more minor every-day type current damage such as door dings, scratches, faded paint or interior, etc.

Warranty Information

The systems and methods of the present invention may be further utilized in conjunction with one or more entities adapted to report the status of a warranty (or provide other warranty-related information) for one or more automobiles. For example, the warranty reporting entities may disclose that an automobile is still under a factory or third-party (aftermarket) warranty, remaining time and/or mileage on that warranty (as many auto warranties are structured as "lesser of X years or Y miles"), and/or whether an existing warranty may be extended. This information, similar to the information disclosed above, may be sent to a client device via email, text message/SMS, and/or voice message.

In one embodiment, the user is also provided with data indicating the level of warranty service actually performed on the vehicle (if available). For example, a history of multiple non-routine service calls on a car may be indicative of a "lemon" or one which has undergone significant mistreatment or damage. In one variant, the aforementioned SMS/text provided to the user has a multi-digit code which indicates (i) the number of services at a factory authorized service center; and (ii) the type of each service (e.g., "R" for routine or preventive maintenance, and "O" for other). A car with multiple "O's" may therefore indicate a problem vehicle.

In another embodiment, the user may further be given an opportunity to purchase an extended warranty or related (e.g., complementary) coverage, if available. The purchase may be routed through a separate server associated with a warranty vendor or multiple vendors, or routed through the service described above and then to a third party vendor. These vendors utilize information about the vehicle and the user to generate an extended warranty contract which is forwarded to the user (via email, regular mail, or other mode). For example, a warranty vendor may obtain information about the vehicle by utilizing the VIN and/or may gain information from the vehicle manufacturer. This information is then forwarded to a call center which completes a warranty contract, or may generate an email to be sent to the registered email address associated with the user.

Methodology

Figure 6A:
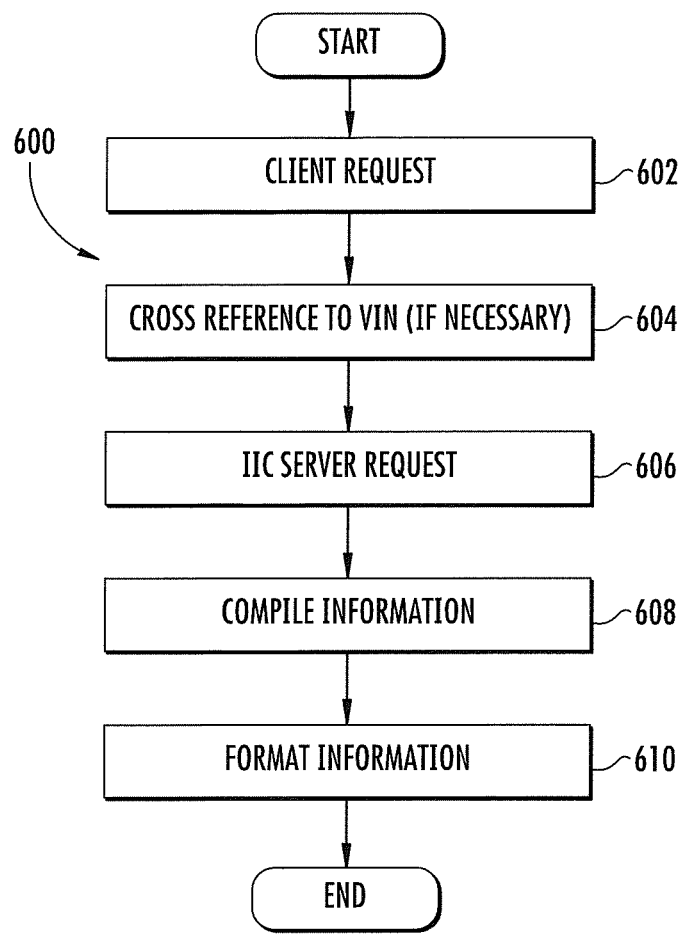
FIG. 6a is a logical flow diagram illustrating an exemplary method of employing the IIC server of FIG. 1 to obtain item information at a client device.

An exemplary method 600 of employing the IIC server 100 of the present invention to obtain item information at a client device is now described with respect to FIG. 6*a*. As illustrated, at step 602, the client sends distinguishing information about the item(s) the client is interested in obtaining information about, such as the vehicle VIN or a picture of the VIN, the AID, or the item number to the IIC server 100. In one embodiment, the distinguishing information (VIN, AID or the like) is sent from the client device 202 to the IIC server 100 via an SMS server 110. Then, per step 604, if the distinguishing information is an AID or item number, it is cross-referenced to a VIN number. In one embodiment this is accomplished via connection to an AID database 212. Then, per step 606, a request is sent from the IIC server 100 to various item information servers 120, including for example, an estimated resale server 204, an estimated wholesale server 206, an vehicle history server 208, an inspection information server and/or auction servicer server 210. Per step 608, information received from the item information servers 120 is then compiled and formatted into an FIR suitable for transmission to the client in a reply message (step 610).

Figure 6B:
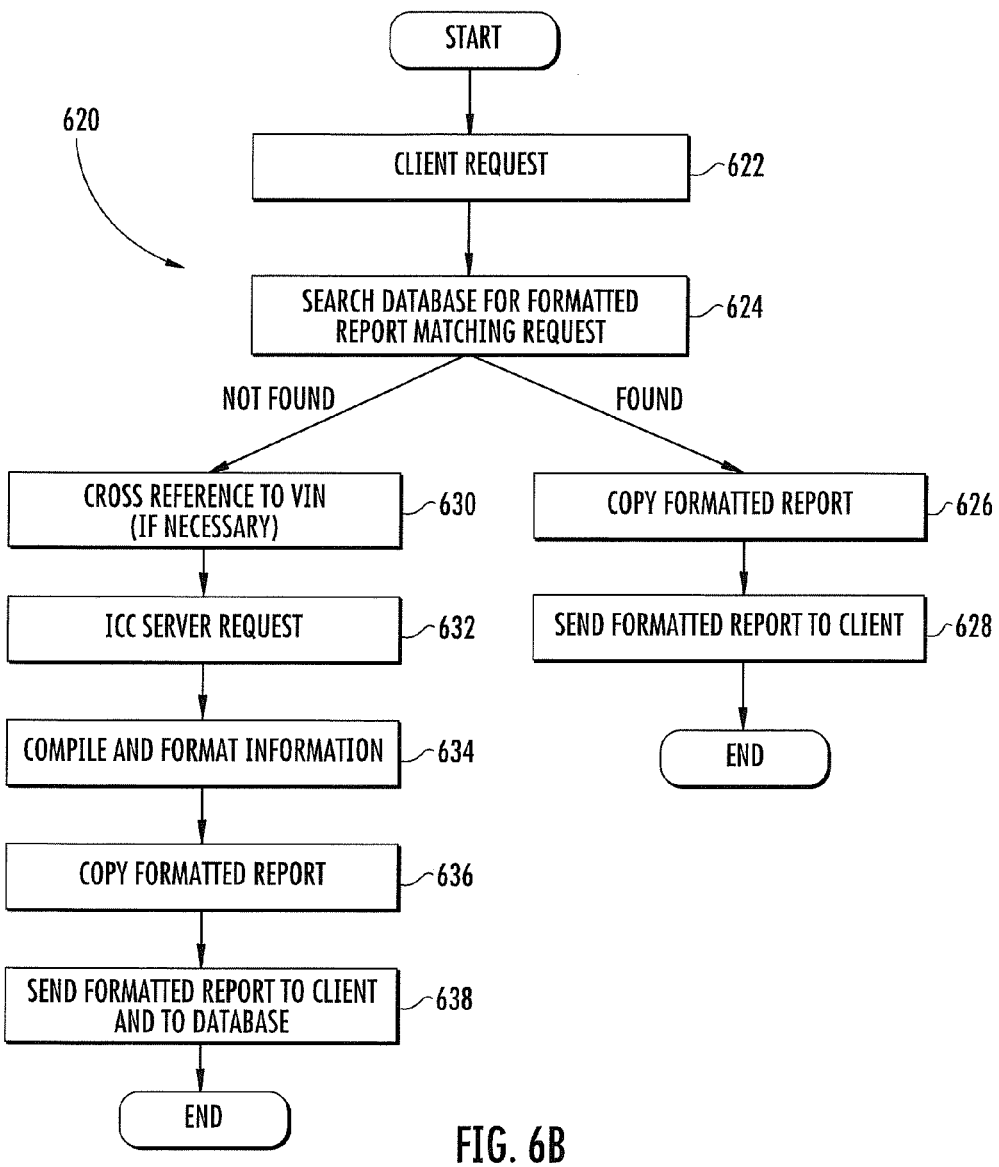
FIG. 6b is a logical flow illustrating an exemplary method of utilizing the IIC server and the IIC database of FIGS. 1 and 4, respectively to efficiently present item information to a client device.

An exemplary method 620 of utilizing and updating an IIC database 400 for the presentation of item information to a client device is given in FIG. 6*b*. The method 620 comprises at step 622 the client requesting information about a particular item. The request is, in one embodiment, accomplished by the client sending the AID or VIN (or other distinguishing information) to the IIC server 100 via an SMS server 110. Per step 624, the IIC server 100 searches the IIC database 400 for a FIR relating to the AID or VIN submitted. If a FIR is found, then, per step 626, it is copied; and, per step, 628 sent to the client. Alternatively, if no FIR relating to the AID or VIN submitted is found, the IIC server 100 cross-references the AID to a VIN number, if necessary (step 630) and then uses the VIN number to request information from the various item information servers 120 (step 632). The received information is then compiled and formatted into an FIR (step 634). At step 636, the FIR is copied and at step 638, one copy is transmitted to the client in a reply message and one copy is pushed to the database 400.

Figure 6C:
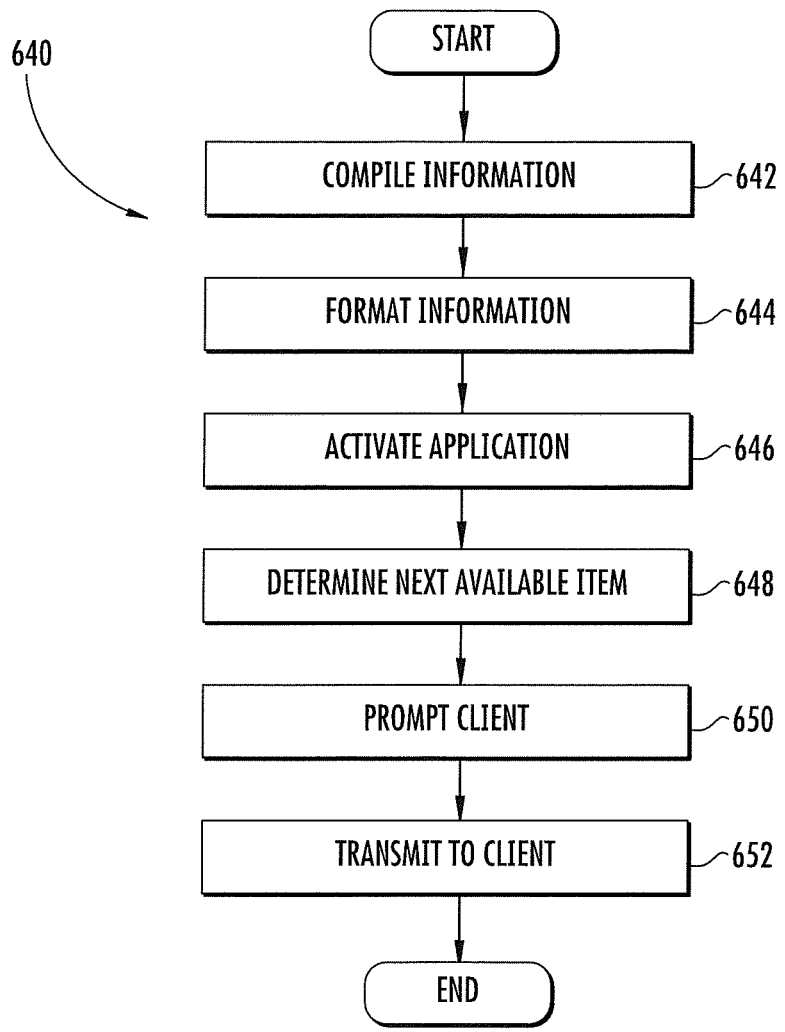
FIG. 6c is a logical flow diagram illustrating an exemplary method of automatically presenting information regarding items for auction.

An exemplary method 640 of automatically presenting information regarding items for auction is given in FIG. 6c. As illustrated, at step 642, the method 640 comprises compiling information regarding each of a plurality of items for auction, then per step 644, the information is formatted into a format which may be easily and quickly transmitted to a client device (e.g., a text message or instant message). At step 646, the client activates the application on the client device. Then, at step 648, the next available item up for bid is determined. At step 650, the client is prompted to indicate whether the client would like information relating to the next item for bid. If the client does indicate a desire for such information, then at step 652, the information is transmitted to the client.

Figure 6D:
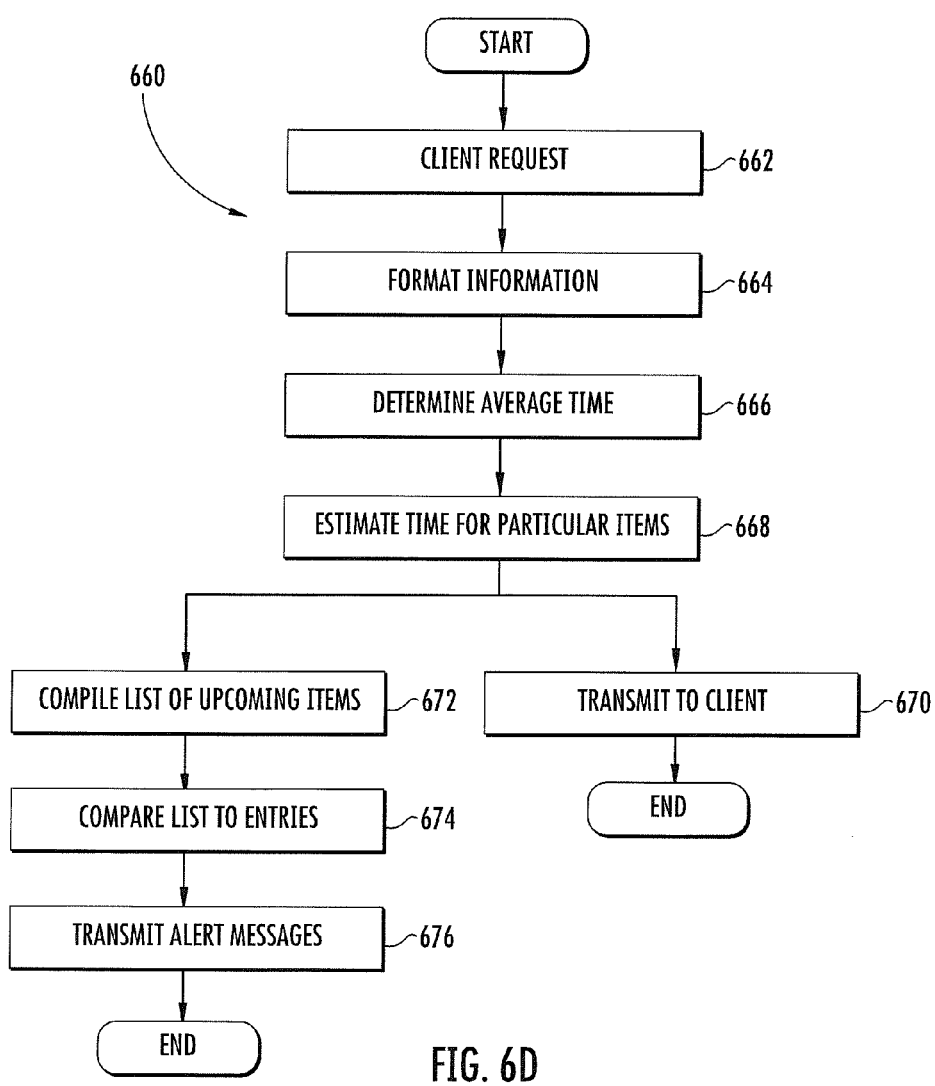
FIG. 6d is a logical flow illustrating an exemplary method of utilizing previous sales timing information to estimate and alert a client to the beginning of bidding of an item at auction.

FIG. 6d illustrates an exemplary method 660 for utilizing previous sales timing information to estimate and alert a client to the beginning of bidding of an item at auction. As shown, the method 660 comprises at step 662 requesting information about a particular item. This is, in one embodiment, accomplished by the client sending the AID or VIN (or other distinguishing information) to the IIC server 100 via an SMS server 110. Per step 664, an entry is created indicating the client's interest in the particular item and/or an interest in receiving an alert and/or an interest in receiving an estimate as to when the item will come up for auction. Per step 666, an average time per item is determined given data regarding the time required to sell previous items. Using the average time required, the time for the particular item of interest is estimated (at step 668). The estimated time may be sent to the client, at step 670. Alternatively, average time may be used to compile a list of items which are within a certain time range of being available for auction (step 672), and at step 674, list of items within a certain time range is compared to a list of entries representing clients who have expressed interest in one or more items. At step 676, alert messages regarding the items which will come up for auction within the time range of interest are sent to the appropriate clients.

Item Information Collection Using Shortened Form Vehicle Identification Number (VIN)

A world-wide standard established by the International Organization for Standardization (ISO) for VIN systems has been implemented in many countries. As illustrated in FIG. 7, according to the standard, the VIN comprises three sections; the first section describes the world manufacturer identity 702, the second describes the vehicle 704, and the third identifies the vehicle 706. The last 6-8 digits of the vehicle identification section 706 generally are standardized to indicate a serial number and assembly line where a particular vehicle was manufactured, the number the vehicle was off the line, and the plant which manufactured the vehicle. Thus, the final few digits of a vehicle's VIN in many instances comprise a series of numbers which are completely unique to that particular vehicle.

Accordingly, in another embodiment of the present invention, rather than using a full seventeen (17) digit VIN, a shortened form of the VIN (the final 6-8 digits) may be provided to the IIC server 100 to receive information about the vehicle. In other words, a user, in one embodiment, may simply transmit the last 6-8 digits of a VIN via SMS text or web-based message to the server 100 of FIG. 2. The user will then be returned the FIR corresponding to the vehicle in question.

Figure 8:
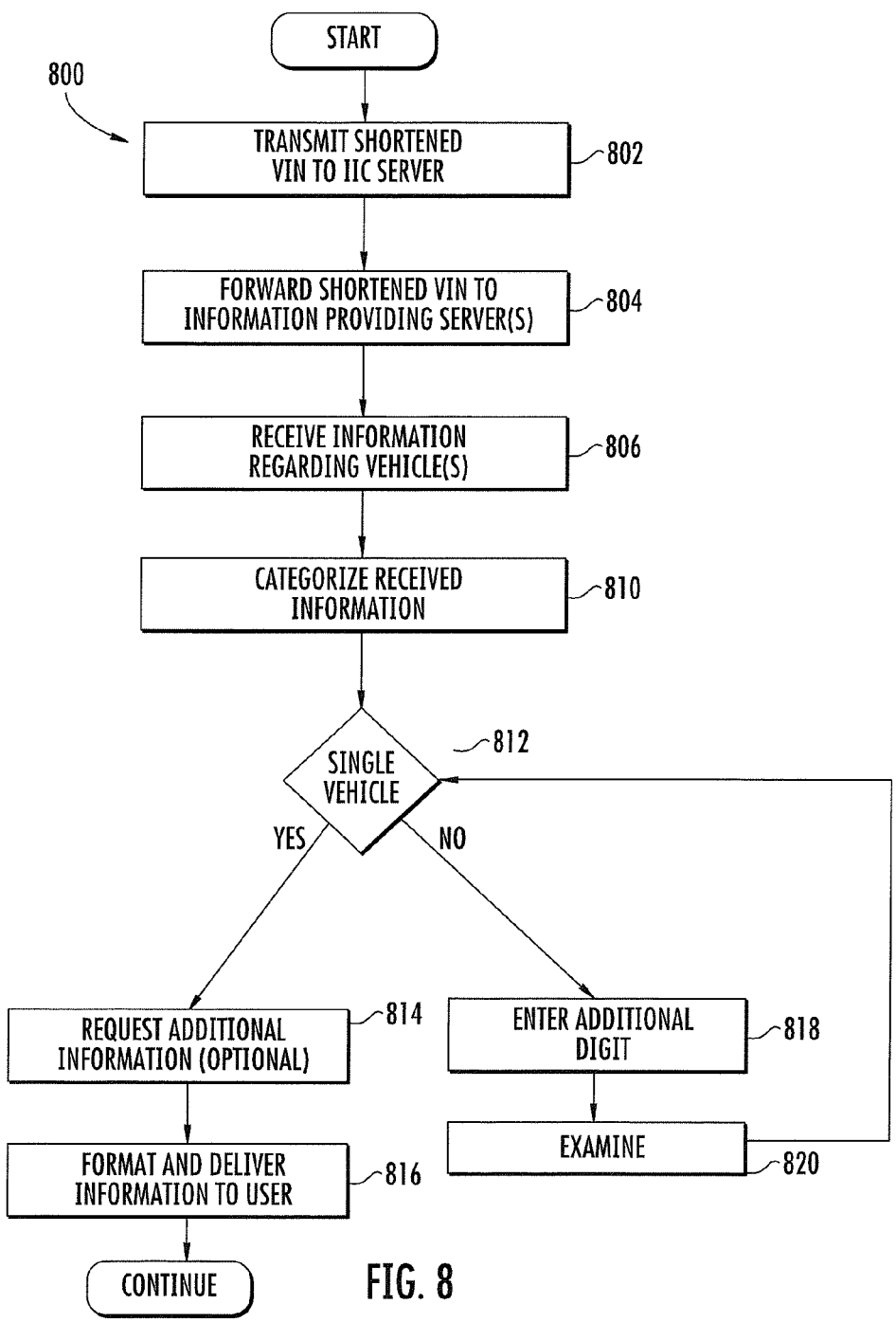
FIG. 8 is a logical flow diagram illustrating an exemplary method of utilizing a shortened form VIN to obtain information form the IIC server of FIG. 1.

As noted previously, the final 6-8 digits of a VIN are often unique to a particular vehicle. However, in certain cases the final 6-8 digits of a VIN will produce ambiguous results, i.e., may not be unique to a single vehicle but instead may be identical for two or more vehicles. In order to determine whether the submission of the final 6-8 digits of a VIN to the IIC server 100 will produce ambiguous results, a computer program may be run on the IIC server and perform the methods disclosed herein with respect to FIG. 8.

Per step 802 of the method 800, the computer program prompts the user to enter only the final 6-8 digits; the shortened VIN is then transmitted to the IIC server 100. The IIC server 100 then, per step 804, sends the shortened VIN to one or all of the information providing servers 204, 206, 208, 210. At step 806, the IIC server 100 receives from the information providing server(s) 204, 206, 208, 210 information regarding the one or more vehicles having the shortened VIN. For example, if the IIC server 100 merely sends the information to e.g., the vehicle history server 208, the server will return information regarding every automobile having sharing the shortened VIN. Alternatively, the IIC server 100 may send the information to more than one information server and receive back a plurality of information which relates to one or more vehicles.

Per step 808, the computer program running on the IIC server 100 examines the information received from the server(s), such as EVR, VHR, and/or MR and organizes the results into one or more categorizes based on the complete VIN. If results regard a single vehicle, then the organization will produce a single category at step 810. If the information regards a single vehicle only, the computer program may then proceed at step 812 to request additional information form any remaining information providing servers using the VIN (if necessary). Per step 814, the information is then formatted and delivered (in the form of an FIR) to the user.

At step 810, the categorization of the received information results in two or more categories, i.e., two or more vehicles share the shortened VIN, computer program may be configured to prompt the user for entry of an additional digit (step 816). In other words, the user may be prompted to enter the digit of the VIN which immediately precedes the entered 6-8 digits. At step 818, the computer program utilizes the additional digit to examine the various vehicles sharing the shortened VIN. If the provided digit enables the computer program to narrow the pool of vehicles to just one vehicle (step 812), then the method repeats at step 814. If it still cannot be determined which vehicle a user is requesting information about, the program may continue to prompt the user for more digits (step 816).

For example, suppose the full VIN of a particular vehicle which a user would like information about is 2HNYD28358H537353 and that the user is prompted to enter the last 7 digits of the VIN (H537353) as the shortened VIN. The shortened VIN is then transmitted to the IIC server 100 which subsequently transmits the shortened VIN to the vehicle history server 208 for a search based thereon. In this example suppose the vehicle history server 208 returns three VHRs based on the shortened VIN to the IIC server 100 for the following three vehicles:

Vehicle #1—2HNYD28358H537353;

Vehicle #2—2PKLM25084H537353; and

Vehicle #3—2PTSM54183H537353.

The IIC server 100 then categorizes the received reports based on the full VIN. Thus, three categories are created, the first category for the VIN 2HNYD28358H537353 having the VHR for that VIN placed therein, and so forth. If the IIC server 100 had queried other servers 204, 206, 210 (as well as the vehicle history server 208), the additional reports and information received therefrom would also be categorized into one of the above three categories based on the full VIN as indicated above. For example, EVR received from an estimated resale server 204 and/or a wholesale server 206 for each of the three vehicles are also placed into a category according to the full VIN. Because three VHRs were received, the computer program running on the IIC server 100 will next prompt the user to enter another digit of the VIN for the vehicle he/she is attempting to gain information about. In the presented example, the digit just before the previously entered 7 digits (of the shortened VIN) for the vehicle in question is 8, thus the user would enter an 8 when prompted. The IIC server 100, upon receiving the entry would compare the entered digit to the tenth digit of each of the full VINs. In the present example, the computer program determines that the user is not requesting information about Vehicle #2 or Vehicle #3, as the VINs do not match; thus it no longer needs the information stored with respect to these vehicles. Next, the IIC server 100 formats and sends all of the information stored in the first category (i.e., category relating to the first vehicle) to the user. If information has not been requested from the remaining information providing servers 204, 206, 210, the IIC server 100 may also request information therefrom using either the shortened or full VIN, formats, and transmits the information to the user as discussed above.

In yet another embodiment, an alpha, numeric or alpha numeric descriptor of 6-8 characters may serve the same purpose as the shortened VIN discussed above (the final 6-8 digits of the VIN). For example, descriptor "BMW7654" may be utilized. The foregoing example utilizes the vehicle make/model which provides the equivalent amount of information as additional digits of the VIN and is much easier for users to enter then a complex string such as a VIN.

Portable Vehicle Information System

One salient advantage of the methods and apparatus disclosed above regarding provision of a system which enables a user to enter a VIN (or shortened form thereof) for obtaining information about a vehicle regards the ability of the system to communicate information to the user efficiently, and without the requirement of having interne access. In other words, a user need not rely on the seller's report of vehicle history and value, but rather, enables the user to verify this information him/herself no matter where the user is. The aforementioned IIC server 100 provides a user with a portable substitute for looking up and receiving auto history and estimated value reports which does not require the user to have internet access and which provides information to the user in a format which is easily displayed on a mobile device.

Verbal Reporting

Figure 9:
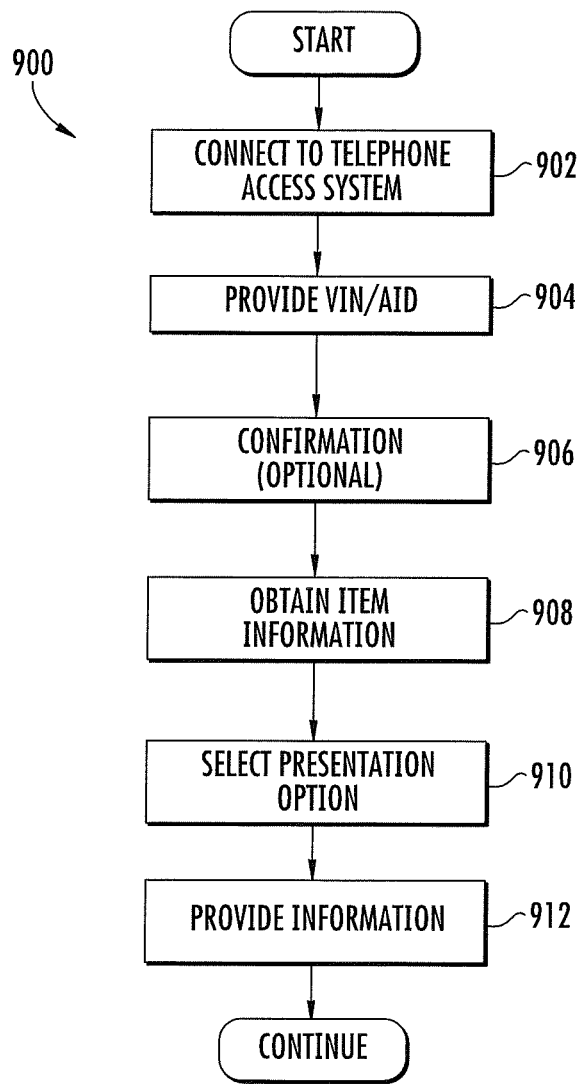
FIG. 9 is a logical flow diagram illustrating an exemplary method of utilizing a verbal reporting embodiment according to the present invention.

It is further appreciated that the aforementioned systems and methods may be implemented in verbal form, as illustrated in FIG. 9. As illustrated, per step 902, a user connects to a telephone access system. The telephone access system may comprise an automated system accessed by the user dialing a telephone extension (such as a toll-free, 800, or 866 number). At step 904, the user is then connected with a first menu where the user may speak, or dial a VIN (or shortened VIN) or AID. The VIN or AID is optionally confirmed at step 906, such as by a mechanism for verbally repeating the VIN or AID back to the user so that the user may confirm (such as by pressing a key to indicate correctness). Where the repeated VIN or AID is not correct, the user may be given an option to indicate it is incorrect and re-enter it (either by speaking or dialing). The confirmation step 906 reduces erroneous reporting.

Per step 908 of the method 900, the entered (and optionally confirmed) VIN or AID is then used to obtain information regarding the item. In one embodiment, the methods disclosed above, e.g., utilizing the IIC server 100, are implemented at this step. Other methods for obtaining information regarding an item may also be utilized as well.

The user, at step 910, selects from among one or more options for the presentation of the item information. For example, the user may select to have the information presented verbally (such as via a computer automated speech synthesis system), or presented in email, text/SMS message or other message form. This selection may also be pre-stored; e.g., the user may configure his/her account such that it always defaults to text delivery unless told otherwise.

At step 912, the information is presented to the user via the selected mode.

Client Interface/Account Generation and Management

In one embodiment, the features and options discussed above may only be accessible to clients who have registered and generated an account with the IIC server 100. Registration and account generation may be coordinated through one or more Internet-based interfaces. Thus, a client may be able to set-up an account with the IIC server 100 via an Internet connection and a device capable of accessing the Internet (such as a PC, laptop computer, PDA, or other client device).

In order to establish an account (register or set-up), the client will navigate any standard internet browser in order to access a website tied to the IIC server 100. The website will have at least one tool for demonstrating the capabilities of the IIC system as well as one tool for enabling clients to "sign up" for IIC system services.

It is appreciated that a quick description of product and advertising slogans may be displayed on one or more pages of the website. One or more pages of the website may advertise a dedication to quality, and the general purpose of the IIC system. The IIC system partners (such as item information server 120 owners) may also be displayed to clients and potential clients. For example, the website may indicate a partnership with such companies and services as, inter alia, Auto Check, CarFax (for providing vehicle history reports), and Manheim (for providing wholesale pricing information).

Information regarding membership fees, service fees, and subscription levels may also be presented to clients via the web interface. A linked email address and/or questions/comments page may also be presented.

The website will present the client with a policy and licensing agreement for use of the protected methods and apparatus of the IIC system with an option for the client to accept the terms thereof.

Actual registration (set-up) of an account comprises providing the IIC server 100 with a name, a phone number associated with the client's client device (for accessing and utilizing the IIC system) via the web-based interface. In one embodiment, once the client has entered the above information, the client may test functioning of the system by indicating a desire to receive a test message from the IIC server 100. After the system has been optionally tested, the client provides payment information (including credit card account number, bank information, check card information, check routing number and account, and/or debit card information). The client will be given options to select from subscription plans and/or billing options (such as monthly, weekly, per request, etc.).

Once the payment and other information is received by the IIC server 100, the client will be associated to an account number and added to a client database associated with the IIC server 100.

The client will then establish an account password and log-in ID so as to be able to review and edit his account options at the web-based interface (e.g., change payment information, change status of the account, change a subscription level, change a telephone number, and/or change the current password or login ID associated with the client's account, etc.), pay bills, view upcoming auctions, receive email messages, etc. It is appreciated that in the event a client is unable to enter a proper login ID and/or pass word, temporary and/or then-existing passwords and/or ID will be sent to the client device associated with the account via SMS message.

Preferences and Searching

In another embodiment, the client may be provided with options for searching a database of automobiles (or other auctioned items) at the web interface. A user is given access to multiple auctions listed by location and/or date. The user can then search the auction(s) of interest for items having particular features or options that the user is interested in. For example, a particular user may be interested in purchasing a BMW at an automobile auction. The user enters features of the BMW such as year, model, color, mileage, etc. into a search engine. The search engine then returns a list of all of the vehicles at the designated auction(s) which match the user's criteria. The search engine is, in one embodiment, adapted to search the auctioned items according to any of the aforementioned criteria as well as others not specifically listed yet germane to the auctioned items themselves. In one embodiment, the search engine may comprise a search engine run from an auction servicer website such as Manheim, etc.

It is also appreciated that a user may create a personalized list of auctioned items. In other words, the user may select one or more automobiles (or other auctioned items) to receive notifications, alerts, or other messages about; the automobiles may be selected from, e.g. the results of the aforementioned search and/or may be manually entered. In one embodiment, the personalized list may comprise a list similar to the Watch List product offered by Manheim. The user may be given an option to have the personalized list forwarded via email, SMS text message, voice message or otherwise to the user's client device prior to the date and time the auction is to take place. As noted previously, the user's client device may comprise any mobile electronic device capable of receiving SMS or other data/text messages, email messages or voice messages, such as e.g., a 3G smartphone with broadband capability, such as the ubiquitous Apple iPhone.

Information used in creating the personalized list, as well as the list itself, are held confidentially and securely, such as by utilizing an Secure Sockets Layer (SSL) or Transport Security Layer (TSL) tunnel to transmit data.

Tracking Server

Figure 10:
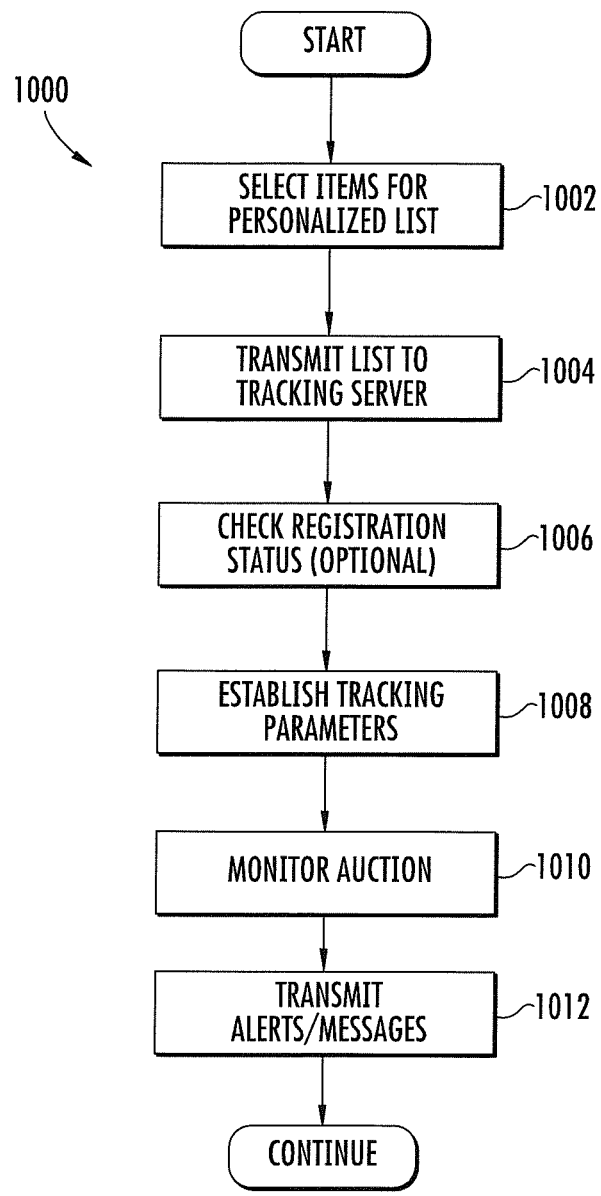
FIG. 10 is a logical flow diagram illustrating an exemplary method of monitoring an ongoing auction according to the present invention.

In yet another embodiment, a tracking server is utilized. In one variant, the tracking server tracks the status of each of the items in the auction according to the method 1000 illustrated in FIG. 10. As shown, at step 1002, items are selected by a user for a personalized list. The items are selected for example as described above. The personalized list may be similar to the Watch List product disclosed above as well.

The list is then transmitted or linked to the tracking server (step 1004). The link between the personalized list and tracking system may be established via any number of methods. For example, information regarding each user's personalized list may be securely or non-securely transmitted from a first web server to a tracking server every pre-determined interval of time (e.g., every 2 minutes, etc.). In another embodiment, personalized lists, as soon as created, are forwarded to a tracking server. Other procedures may be used as well.

Per step 1006, the lists are optionally examined to determine whether the user associated with the list has also enrolled or registered for the tracking system. If the user has not registered, they will be given an opportunity to do so.

Next, at step 1008, the user establishes the aspects of tracking. For example, the user may establish that server should send an alert to the user's device (either via SMS text, voice, data, or email message) when a tracked item is a pre-determined number of minutes or vehicles away from beginning auction, when the auction on the item has begun, when the auction on the time has ended, etc.

Per step 1010, the tracking server monitors the auction. The tracking server may be updated via methods which implement current technologies for managing status of the items in an auction. For example, the Internet-based Manheim Simulcast 3.0 system may be utilized in conjunction with the aforementioned tracking system to provide the tracking server with updated status information with respect to tracked items. In one embodiment, the tracking server establishes individual sessions directed at each lane of an automobile auction that is currently running.

In another embodiment, the tracking server may be fed data regarding an entire auction simultaneously.

In yet another embodiment, the tracking server may be integrated with an on-site auction management entity. For example, the tracking server may establish a connection with lane management and/or on-site auction management computers in an automobile auction. The tracking server uses the information gained from the auction management entities to estimate a time when auction will begin on each item.

The tracking server uses the updated auction information to, at step 1012 determine which users to alert (such as by sending text or other messages to the user) regarding items which the user has elected to track. For example, the user may wish to be informed when an auction for a particular item is set to begin within five minutes. The information received from the various management entities is compared to a plurality of individual personalized lists to determine such timing, which is forwarded to the client in the form of alerts, etc. (such as via text message, voice message, email, etc.). Other status information about the items in a user's list may also be forwarded to the user's client device.

In a further variant, a user may communicate with the tracking server so as to track an item during, or just prior to the beginning of an auction. In this embodiment, a user may, via a client device send a message to the tracking server indicating an item number (such as a lane number and run number in an automobile auction) to begin tracking. This may be performed e.g., while the user is at the auction and without requiring the item to be listed on a tracking list. In the instance the user has a personalized list, the additional item may be added thereto. It is also appreciated that a user may be granted access to the tracking system via a web interface; the interface providing the user a means for entering an auction item number for the item to be tracked.

Recommendations

Figure 11:
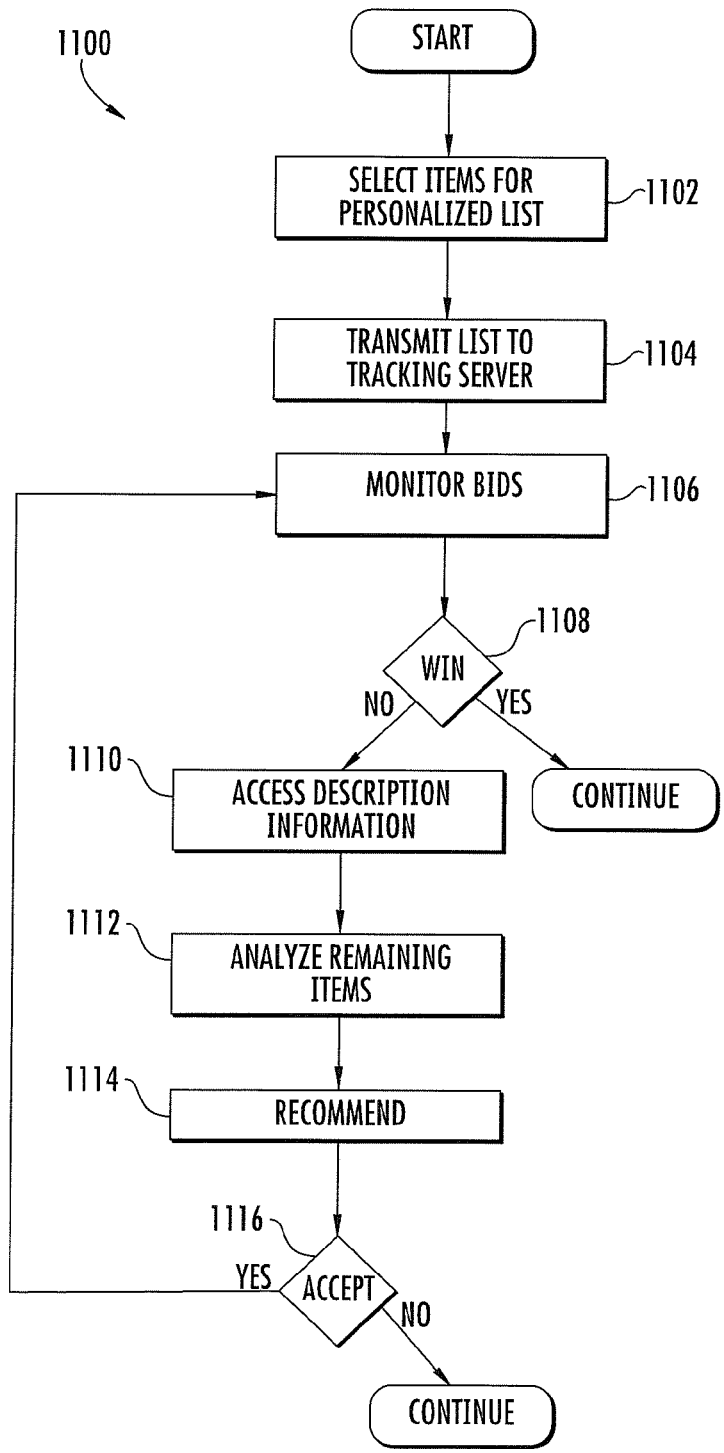
FIG. 11 is a logical flow diagram illustrating another exemplary method of monitoring an ongoing auction according to the present invention.

The tracking server may further be utilized to recommend items to a user based on previously bid on items as illustrated in the method 1100 of FIG. 11. As illustrated, per steps 1102 and 1104, a user creates a personalized list of items which is transmitted to the tracking server. It is appreciated that the personalized list may be generated by e.g., the searching methods disclosed above. It is further appreciated that the personalized list may comprise a Watch List as utilized by Manheim. The transmission of the personalized lists to the tracking server may be accomplished via any one of the methods disclosed above.

Per step 1106, the tracking server monitors the bids in an auction. In other words, the tracking server is configured to receive and analyze information regarding the "winner" of each auctioned item. For each auctioned item, the tracking server determines which bidder has entered the winning bid, the tracking server then compares this information to every user which has opted to track the auctioned item (step 1108).

If the user has not won the bid on a particular item, at step 1110, the tracking server accesses information describing the item. At step 1112, the descriptive information is utilized by a recommendation entity for comparison to remaining items. In one embodiment, the recommendation entity comprises a computer program adapted to extract data regarding a first auction item and utilize the data to discover and report (i.e., recommend) to the user other similar items at the same auction (step 1114). The recommendation entity may recommend alternative items, for example, each time a user adds an item to a personalized list. In other words, the recommendation entity receives a message that User A has added a 2007 Black Toyota Camry to his personalized list. The recommendation entity extracts information from the message regarding the User A, such as the users contact information, historical auction data, etc. The recommendation entity also extracts information from the message regarding the auctioned item. The information about the auctioned item is compared to a database of items for auction in order to find additional auction items which are substantially similar to one or more aspects of the selected item. In one embodiment, the search engine may be of the type previously discussed herein. In the given example, the recommendation entity may search for other 2007 vehicles, other Toyota Camrys, etc. The recommendation may use any combination of the features of the selected item to search for similar items.

The user is presented with recommendations (step 1114) and if the user selects one of these options, the tracking server beings monitoring bids with respect to this item (step 1106), such as via the methods disclosed above (establishing a connection to one or more auction management entities or computers).

In another embodiment, the recommendation entity may use one or more factors for broadening a search for auction items similar to a selected item. For example, the recommendation entity may "pad out" the model year of a vehicle to search for similar cars which may be older or newer than the selected car. The recommendation entity may further classify the item such as classifying the Toyota Camry as a 4-door or mid-sized sedan, etc. Various classification and padding schemes may be utilized consistent with the present invention.

The recommendation entity may also be adapted to utilize a set of parameters or preferences entered by a user. In a similar manner as that discussed above with respect to searching, a user may enter one or more criteria for recommendations. The recommendation parameters may be broader than specific options or features. For example, a user may be prompted to enter a model year range, or select more than one of a plurality of options (such as different models, manufacturers, or colors), or select from a category of vehicle types (such as SUV, sedan, sports, etc.).

Recommendations may alternatively be presented to a user when the tracking entity informs the recommendation entity that a particular user has won or lost an auction on a selected item. Another Toyota Camry up for auction may be recommended to the winner of an auction for the 2007 Black Toyota Camry. Similarly, other 2007 4-door sedans may be recommended to the user(s) tracking the 2007 Black Toyota Camry who did not win the auction.

The recommended items may be presented to a user in a ranked order, such as by closest match or next available for auction. This may be done by utilizing information gained from the VIN to view the full options associated with the vehicle and comparing this information to the options available for other vehicles. In addition, a vehicle's condition may be accessed by examination of e.g., a condition report (such as that available via Manheim) which contains a full options list a full set of information about scratches and damage to the vehicle as well as estimated repair times and repair costs. It is further appreciated that a user may elect not to view recommended items and/or dismiss recommendations easily such as from the client device. The user may also establish settings for the recommendation of alternatives, including limiting the number of recommended vehicles (i.e. 10 per auction/day) to be forward by at a preferences portion of the web interface.

Selling/Trading-In an Item

In another embodiment, the aforementioned systems and methods may be adapted to enable a potential buyer to assess the value of an item for sale. For example, a user (whether an individual or an automobile dealership) may utilize the system described above to make a trade-in or purchase offer on an automobile. According to this embodiment, the user (buyer) enters the VIN (or shortened VIN) to obtain information regarding a seller's car. As noted above, the information may comprise a vehicle history report, estimated value report, market report, etc. From this information, the user (buyer) may make an estimate as to the value of the car. Sending the information to a client device may enable the buyer to make an offer "on the spot".

It is further appreciated that certain additional information may be required in order to more closely approximate the value of an automobile. For instance, the user (buyer) may be prompted to enter the general condition of the car, mileage, and optional features (such as power windows, power locks, leather interior, after market upgrades, etc.). Alternatively, some of this information may be gained from e.g., the VIN and/or condition reports. Then, upon entry of these additional details, the estimated value of the vehicle may be adjusted by e.g., a processing entity in communication with the aforementioned reporting entities. The processing entity having access to the established costs associated with individual damages that insurance companies have developed as well as to costs and values for specific option packages and mileage depreciation is readily available (such as via e.g., Edmunds). By utilizing these rough estimations much similar to the condition reports the processing entity estimates the actual vehicle value.

Business Methods and Considerations

Various exemplary business-related aspects of present invention are now described in detail.

In one embodiment, access to the various ones of the above-described features of the IIC system are featured as part of one or more optional subscription plans.

For example, access to increased number of item information servers 120 may be charged at a premium over more basic information servers 120. Thus, a first subscription plan may offer access to only one vehicle history server 208, while another plan may offer access to more than one and/or to more renowned vehicle history servers 208 (charged at a higher premium to the client).

In another example, a client may develop a personalized set of information servers 120 each server addition increasing the rate for the service.

In yet another example, access to the time estimate and/or alarm/reminder feature may be charged at a premium over more basic services.

In another example, a user may be offered different reporting levels at different price ranges. For example, access to a full report (such as one containing all information about a vehicle from every information server) may be offered at a higher premium than access to a partial report (such as one comprising short messages generally summarizing information from one or all of the information servers). Still further, a user may be given an option to receive both a full report and a partial report, the full report being sent to an email inbox and the partial report being sent via SMS text message, voice message, or other shortened form.

It is also appreciated that the aforementioned services may be offered on per item inquired into (such as per automobile). Alternatively, a user may purchase a subscription for access to the services on a per-auction, per-month, and/or per-year basis.

Operations/Business Rules Engine

In another aspect of the invention, the aforementioned processor 104 running on the IIC server 100 (one or more computer programs located thereon) includes a so-called "rules" engine. These rules may be fully integrated within various entities associated with the present invention, or may be controlled via e.g., the client device 202. In effect, the rules engine comprises a supervisory entity which monitors and selectively controls the item information acquisition and delivery functions at a higher level, so as to implement desired operational or business rules. The rules engine can be considered an overlay of sorts to the remote content management and delivery algorithms.

For example, one rule implemented by the rules engine may comprise providing alerts/reminders to certain classes of subscribers or users (e.g., those at a premium level of service, or subscribers who have "opted-in" to receiving the alerts/reminders).

Another rule might comprise providing access to additional information or features such as detailed research, information, access to law enforcement or manufacturers records, etc., for subscribers who sign up for a "premium" plan.

Many other approaches and combinations are envisaged consistent with the invention, as will be recognized by those of ordinary skill when provided this disclosure.

It should be recognized that while the foregoing discussion of the various aspects of the invention has described specific sequences of steps necessary to perform the methods of the present invention, other sequences of steps may be used depending on the particular application. Specifically, additional steps may be added, and other steps deleted as being optional. Furthermore, the order of performance of certain steps may be permuted, and/or performed in parallel with other steps. Hence, the specific methods disclosed herein are merely exemplary of the broader methods of the invention.

While the above detailed description has shown, described, and pointed out novel features of the invention as applied to various embodiments, it will be understood that various omissions, substitutions, and changes in the form and details of the device or process illustrated may be made by those skilled in the art without departing from the invention. The described embodiments are to be considered in all respects only illustrative and not restrictive. The scope of the invention is, therefore, indicated by the appended claims rather than the foregoing description. All changes that come within the meaning and range of equivalence of the claims are to be embraced within their scope.

What is claimed is:

1. A client device capable of data communication with one or more communication networks, said client device comprising:
  a data capture apparatus;
  at least one interface configured to communicate with one or more entities of said one or more communication networks; and
  a digital processor, said processor having at least one computer program configured to run thereon, said at least one computer program comprising a plurality of instructions which are configured to, when executed:
    enable a user of said client device to generate a request for information, said request for information comprising at least one element configured to identify at least one item for auction, said at least one element obtained from information scanned or captured via an application configured to run on said client device;
    transmit said request to said one or more entities of said communication network via said at least one interface; and
    in response to said request, receive information regarding said at least one item for auction.

2. The client device of claim 1, wherein said application configured to run on said client device comprises software associated with a camera on said client device.

3. The client device of claim 1, further comprising an optical character recognition (OCR) algorithm configured to convert image data obtained via said application configured to run on said client device into an appropriate format for inclusion as said at least one element in said request for information.

4. The client device of claim 1, wherein said at least one element for configured to identify at least one item for auction comprises at least a portion of a vehicle identification number (VIN) of a vehicle for auction obtained via said application configured to run on said client device.

5. The client device of claim 1, further comprising a display element configured to display said information regarding said at least one item for auction.

6. The client device of claim 5, wherein said client device comprises a mobile handset, said at least one interface comprises a cellular interface, and said information regarding said at least one item is particularly configured to display on said display element.

7. The client device of claim 1, wherein said information regarding said at least one item for auction comprises information relating to an estimated value of said at least one item for auction.

8. The client device of claim 1, wherein said information regarding said at least one item for auction comprises information regarding a vehicle history.

9. The client device of claim 1, further comprising an optical character recognition (OCR) algorithm configured to receive an unformatted version of said at least one element from said application configured to run on said client device and generate a formatted version of said at least one element for use in at least said request for information.

10. A method of providing information useful in making vehicle purchase decisions, said method comprising:
  receiving a message requesting information regarding at least one vehicle from a mobile device, said message comprising at least a portion of a vehicle identification number (VIN) for said at least one vehicle, said at least portion of said VIN comprising textual data derived from an image;

requesting information regarding said vehicle from an entity configured to compile vehicle information, said request comprising information relating to said at least portion of said VIN;

receiving at least one vehicle history report from said entity, said vehicle history report comprising at least information enabling a user to make said purchase decision; and formatting said at least one vehicle history report into a format suitable for transmission to said mobile device.

11. The method of claim 10, wherein said image comprises an image obtained via at least one of: (i) a camera integrated into said mobile device, and (ii) a scanner device in communication with said mobile device.

12. The method of claim 10, wherein said mobile device comprises a mobile telephone or smartphone, and said message is sent via a wireless cellular network associated with said mobile telephone or smartphone.

13. An apparatus configured to provide information relating to one or more vehicles in an auction, said apparatus comprising:

an interface configured to enable communication between said apparatus and one or more client devices;

an interface configured to enable communication between said apparatus and one or more vehicle information sources;

a digital processor; and a storage apparatus in data communication with said processor and comprising at least one computer program configured to run on said processor, said at least one computer program comprising a plurality of instructions configured to, when executed:

receive a message from said at least one client device said message comprising a request for information regarding said one or more vehicles, said message configured to identify said one or more vehicles by providing at least a portion of vehicle identification information associated therewith, said at least a portion of said vehicle identification information obtained from information scanned or captured via an application configured to run on said at least one client device;

request information regarding said one or more vehicles from said one or more vehicle information sources via at least said at least a portion of said vehicle identification information;

receive said information regarding said one or more vehicles, said information regarding said one or more vehicles comprising information useful in making purchasing decisions during said auction; and transmit said information regarding said one or more vehicles to said at least one client device.

14. The apparatus of claim 13, wherein said information regarding said one or more vehicles comprises one or more of:

an accident history of said vehicle; or an estimated value of said vehicle.

15. The apparatus of claim 13, wherein said plurality of instructions are further configured to, when executed, cause verification of at least one of said one or more client devices via login information received therefrom, said login information configured to identify a user of said at least one client device as one of a plurality of subscribers.

16. The apparatus of claim 15, wherein said login information configured to identify said user of said at least one client device as said one of said plurality of subscribers comprises a password or login identification associated with an account associated to said one of said plurality of subscribers.

17. The apparatus of claim 15, wherein said at least one computer program is further configured to, when executed, when said login information cannot be verified, provide at least a portion of said login information or temporary login information at least one second client device, said at least one second client device being associated with said one subscriber.

18. A method of obtaining vehicle information regarding a vehicle for sale at a mobile device, said method comprising:

receiving an image at said mobile device obtained via a camera function on said mobile device;

using an optical character recognition (OCR) program to convert said image into VIN data at least vehicle identification number (VIN) data related to said vehicle for sale;

sending a request message from said mobile device to a server via said SMS, said request message comprising said converted VIN data, said request message causing said server to communicate with at least one additional server, compile said vehicle information, and format said vehicle information; and receiving from said server said formatted vehicle information;

wherein said formatted vehicle information comprises one or more of an accident history of said vehicle for sale, and an estimated value of said vehicle for sale.

19. The method of claim 18, wherein said VIN data comprises at least one of: (i) a string of 17 alpha-numeric characters representative of said VIN, (ii) a shortened string of numbers representative of said VIN, and (iii) a barcode representative of said VIN.

* * * * *